United States Patent
Johnsen et al.

(10) Patent No.: US 11,805,008 B2
(45) Date of Patent: Oct. 31, 2023

(54) SYSTEM AND METHOD FOR SUPPORTING ON-DEMAND SETUP OF LOCAL HOST CHANNEL ADAPTER PORT PARTITION MEMBERSHIP IN A HIGH-PERFORMANCE COMPUTING ENVIRONMENT

(71) Applicant: Oracle International Corporation, Redwood Shores, CA (US)

(72) Inventors: Bjørn Dag Johnsen, Oslo (NO); Harald Høeg, Oslo (NO); Line Holen, Oslo (NO)

(73) Assignee: ORACLE INTERNATIONAL CORPORATION, Redwood Shores (CA)

(*) Notice: Subject to any disclaimer, the term of this patent is extended or adjusted under 35 U.S.C. 154(b) by 0 days.

(21) Appl. No.: 17/226,665

(22) Filed: Apr. 9, 2021

(65) Prior Publication Data

US 2021/0234765 A1    Jul. 29, 2021

Related U.S. Application Data

(63) Continuation of application No. 15/417,265, filed on Jan. 27, 2017, now Pat. No. 11,018,947.

(Continued)

(51) Int. Cl.
*G06F 15/16* (2006.01)
*H04L 41/08* (2022.01)
(Continued)

(52) U.S. Cl.
CPC .......... *H04L 41/08* (2013.01); *G06F 9/45558* (2013.01); *G06F 9/4856* (2013.01);
(Continued)

(58) Field of Classification Search
CPC .......... H04L 41/12; H04L 41/50; H04L 67/10
See application file for complete search history.

(56) References Cited

U.S. PATENT DOCUMENTS

| | | | |
|---|---|---|---|
| 6,438,130 B1 | 8/2002 | Kagan | |
| 6,480,500 B1 | 11/2002 | Erimli | |

(Continued)

FOREIGN PATENT DOCUMENTS

| | | |
|---|---|---|
| CN | 101807238 | 8/2010 |
| CN | 101826140 | 9/2010 |

(Continued)

OTHER PUBLICATIONS

G. Sachdeva, A. Patel, H. Kasim and S. See, "Simulation of Infiniband Networks and Effciency Calculation on Non-blocking Fully Populated Fat-Tree Topology," 2011 International Conference on P2P, Parallel, Grid, Cloud and Internet Computing, Barcelona, Spain, 2011, pp. 163-168 (Year: 2011).*

(Continued)

*Primary Examiner* — Oscar A Louie
*Assistant Examiner* — Messeret F Gebre
(74) *Attorney, Agent, or Firm* — TUCKER ELLIS LLP

(57) ABSTRACT

Systems and methods for dynamically assigning membership in a data partition to an end-port of a requesting host channel adapter. An exemplary embodiment can provide a subnet manager configured to operate within a subnet of a network fabric. The subnet can include a plurality of nodes, and the plurality of nodes can include at least one switch and a plurality of end-nodes, where the subnet manager executes on one of the plurality of nodes. A host channel adapter of a node in the subnet can request membership for an end-port of the host channel adapter. In response to the request, the subnet manager can request data from the data store to confirm that the end-port is a member of an admin partition (Continued)

and that the admin partition is associated with the data partition in which membership was requested.

20 Claims, 16 Drawing Sheets

Related U.S. Application Data

(60) Provisional application No. 62/287,712, filed on Jan. 27, 2016.

(51) Int. Cl.

| | |
|---|---|
| H04L 49/356 | (2022.01) |
| H04L 49/65 | (2022.01) |
| H04L 41/12 | (2022.01) |
| H04L 41/50 | (2022.01) |
| H04L 9/40 | (2022.01) |
| H04L 61/5038 | (2022.01) |
| H04L 41/0813 | (2022.01) |
| H04L 67/10 | (2022.01) |
| H04L 67/00 | (2022.01) |
| H04L 12/46 | (2006.01) |
| H04L 41/0803 | (2022.01) |
| H04L 41/22 | (2022.01) |
| H04L 41/0806 | (2022.01) |
| H04L 45/64 | (2022.01) |
| H04L 47/70 | (2022.01) |
| G06F 9/455 | (2018.01) |
| G06F 12/0806 | (2016.01) |
| G06F 13/40 | (2006.01) |
| G06F 9/48 | (2006.01) |
| G06F 9/50 | (2006.01) |
| H04L 45/48 | (2022.01) |
| H04L 67/01 | (2022.01) |
| H04L 101/645 | (2022.01) |
| H04L 101/668 | (2022.01) |
| H04L 45/586 | (2022.01) |
| H04L 49/00 | (2022.01) |

(52) U.S. Cl.
CPC ........ *G06F 9/5077* (2013.01); *G06F 12/0806* (2013.01); *G06F 13/4022* (2013.01); *H04L 12/4641* (2013.01); *H04L 41/0803* (2013.01); *H04L 41/0806* (2013.01); *H04L 41/0813* (2013.01); *H04L 41/12* (2013.01); *H04L 41/22* (2013.01); *H04L 41/50* (2013.01); *H04L 45/64* (2013.01); *H04L 47/82* (2013.01); *H04L 49/358* (2013.01); *H04L 49/65* (2013.01); *H04L 61/5038* (2022.05); *H04L 63/10* (2013.01); *H04L 63/20* (2013.01); *H04L 67/10* (2013.01); *H04L 67/34* (2013.01); *G06F 2009/4557* (2013.01); *G06F 2009/45579* (2013.01); *G06F 2009/45583* (2013.01); *G06F 2009/45595* (2013.01); *H04L 45/48* (2013.01); *H04L 45/586* (2013.01); *H04L 49/70* (2013.01); *H04L 67/01* (2022.05); *H04L 2101/645* (2022.05); *H04L 2101/668* (2022.05)

(56) References Cited

U.S. PATENT DOCUMENTS

| | | | |
|---|---|---|---|
| 6,594,712 B1 | 7/2003 | Pettey | |
| 6,718,392 B1 | 4/2004 | Krause | |
| 6,941,350 B1 | 9/2005 | Frazier | |
| 7,010,600 B1 | 3/2006 | Prasad | |
| 7,010,633 B2 | 3/2006 | Arndt | |
| 7,093,024 B2 | 8/2006 | Craddock | |
| 7,103,626 B1* | 9/2006 | Recio | H04L 61/20 709/201 |
| 7,185,025 B2 | 2/2007 | Rosenstock | |
| 7,188,198 B2 | 3/2007 | Beukema | |
| 7,200,704 B2 | 4/2007 | Njoku | |
| 7,283,473 B2 | 10/2007 | Arndt | |
| 7,376,770 B2 | 5/2008 | Arndt | |
| 7,398,337 B2 | 7/2008 | Arndt | |
| 7,409,432 B1* | 8/2008 | Recio | H04L 41/12 370/254 |
| 7,483,442 B1 | 1/2009 | Torudbaken | |
| 7,484,029 B2 | 1/2009 | Boyd | |
| 7,493,409 B2 | 2/2009 | Craddock | |
| 7,496,045 B2 | 2/2009 | Boyd | |
| 7,581,021 B2 | 8/2009 | Errickson | |
| 7,606,965 B2 | 10/2009 | Njoku | |
| 7,636,772 B1 | 12/2009 | Kirby | |
| 7,680,142 B1* | 3/2010 | Tvete | H04L 45/00 370/537 |
| 7,783,788 B1 | 8/2010 | Quinn | |
| 7,802,000 B1 | 9/2010 | Huang | |
| 7,836,332 B2 | 11/2010 | Hara | |
| 7,865,633 B2 | 1/2011 | Wilkinson | |
| 7,907,604 B2 | 3/2011 | Boyd | |
| 7,996,583 B2 | 8/2011 | Wilkinson | |
| 8,009,589 B2 | 8/2011 | Burrow | |
| 8,014,387 B2 | 9/2011 | Arimilli | |
| 8,028,105 B2 | 9/2011 | Arndt | |
| 8,127,003 B2 | 2/2012 | Glaeser | |
| 8,165,136 B1 | 4/2012 | Sharma | |
| 8,185,896 B2 | 5/2012 | Arimilli | |
| 8,331,381 B2 | 12/2012 | Brown | |
| 8,677,023 B2 | 3/2014 | Venkataraghavan | |
| 8,713,649 B2 | 4/2014 | Johnsen | |
| 8,719,456 B2 | 5/2014 | Wilkinson | |
| 8,751,649 B2 | 6/2014 | Villait | |
| 8,776,050 B2 | 7/2014 | Plouffe | |
| 8,989,187 B2 | 3/2015 | Saraiya | |
| 9,219,718 B2 | 12/2015 | Johnsen | |
| 9,268,798 B2 | 2/2016 | De Lavarene | |
| 9,276,959 B2 | 3/2016 | Theimer | |
| 9,369,334 B2 | 6/2016 | Gavrilov | |
| 9,397,960 B2 | 7/2016 | Arad | |
| 9,438,479 B1 | 9/2016 | Friedman | |
| 9,497,080 B1 | 11/2016 | Friedman | |
| 9,529,878 B2 | 12/2016 | Johnsen | |
| 9,537,798 B1 | 1/2017 | Devilbiss | |
| 9,582,319 B2 | 2/2017 | Ayala | |
| 9,602,573 B1 | 3/2017 | Abu-Ghazaleh | |
| 9,628,374 B1 | 4/2017 | Devilbiss | |
| 9,800,471 B2 | 10/2017 | Addanki | |
| 10,038,592 B2 | 7/2018 | Guntaka | |
| 10,503,442 B2 | 12/2019 | Kollu | |
| 2003/0005039 A1 | 1/2003 | Craddock | |
| 2003/0061379 A1 | 3/2003 | Craddock | |
| 2003/0093627 A1* | 5/2003 | Neal | G06F 3/0601 711/153 |
| 2003/0101158 A1 | 5/2003 | Pinto | |
| 2003/0172149 A1 | 9/2003 | Edsall | |
| 2003/0208572 A1 | 11/2003 | Shah | |
| 2004/0030763 A1 | 2/2004 | Manter | |
| 2004/0054866 A1 | 3/2004 | Blumenau | |
| 2004/0202189 A1 | 10/2004 | Arndt | |
| 2004/0215848 A1 | 10/2004 | Craddock | |
| 2005/0044205 A1 | 2/2005 | Sankaranarayan | |
| 2005/0044301 A1 | 2/2005 | Vasilevsky | |
| 2005/0060445 A1 | 3/2005 | Beukema | |
| 2005/0071709 A1 | 3/2005 | Rosenstock | |
| 2005/0100033 A1 | 5/2005 | Arndt | |
| 2005/0120160 A1 | 6/2005 | Plouffe | |
| 2006/0155880 A1 | 7/2006 | Elnozahy | |
| 2006/0230185 A1 | 10/2006 | Errickson | |
| 2006/0230219 A1 | 10/2006 | Njoku | |
| 2007/0058619 A1 | 3/2007 | Gopal Gowda | |
| 2007/0081544 A1 | 4/2007 | Sakai | |
| 2007/0140266 A1 | 6/2007 | Njoku | |
| 2008/0059686 A1 | 3/2008 | Wilkinson | |
| 2008/0114961 A1 | 5/2008 | Ramaswamy | |

(56) References Cited

U.S. PATENT DOCUMENTS

| | | | |
|---|---|---|---|
| 2008/0117917 A1 | 5/2008 | Balay | |
| 2008/0186990 A1 | 8/2008 | Abali | |
| 2008/0189432 A1 | 8/2008 | Abali | |
| 2009/0031381 A1 | 1/2009 | Cohen | |
| 2009/0213753 A1 | 8/2009 | Burrow | |
| 2009/0216853 A1 | 8/2009 | Burrow | |
| 2010/0030995 A1* | 2/2010 | Wang | G06F 16/2282 711/E12.001 |
| 2010/0114841 A1 | 5/2010 | Holenstein | |
| 2010/0145963 A1 | 6/2010 | Morris | |
| 2012/0047313 A1 | 2/2012 | Sinha | |
| 2012/0072562 A1* | 3/2012 | Johnsen | H04L 12/462 709/223 |
| 2012/0079143 A1 | 3/2012 | Krishnamurthi | |
| 2012/0300940 A1 | 11/2012 | Sabin | |
| 2012/0307682 A1 | 12/2012 | Johnsen | |
| 2012/0311123 A1* | 12/2012 | Johnsen | H04L 63/0442 709/223 |
| 2012/0311143 A1 | 12/2012 | Johnsen | |
| 2012/0311682 A1 | 12/2012 | Johnsen | |
| 2012/0314706 A1 | 12/2012 | Liss | |
| 2013/0019303 A1 | 1/2013 | Johnsen | |
| 2013/0051232 A1 | 2/2013 | Gavrilov | |
| 2013/0054947 A1 | 2/2013 | Gavrilov | |
| 2013/0138758 A1 | 5/2013 | Cohen | |
| 2013/0138836 A1 | 5/2013 | Cohen | |
| 2013/0138971 A1 | 5/2013 | Budko | |
| 2013/0254321 A1 | 9/2013 | Johnsen | |
| 2013/0254368 A1 | 9/2013 | Guay | |
| 2013/0254404 A1 | 9/2013 | Johnsen | |
| 2013/0311465 A1 | 11/2013 | Muramoto | |
| 2014/0032228 A1 | 1/2014 | Johri | |
| 2014/0059195 A1 | 2/2014 | Sajeepa | |
| 2014/0064287 A1 | 3/2014 | Bogdanski | |
| 2014/0122675 A1 | 5/2014 | Cohen | |
| 2014/0122761 A1 | 5/2014 | Nagendra | |
| 2014/0195666 A1 | 7/2014 | Dumitriu | |
| 2014/0237682 A1 | 8/2014 | Regula | |
| 2014/0241355 A1 | 8/2014 | Tsirkin | |
| 2014/0379756 A1 | 12/2014 | Shivarudraiah | |
| 2015/0026213 A1 | 1/2015 | Hegde | |
| 2015/0063356 A1 | 3/2015 | Makhervaks | |
| 2015/0135255 A1 | 5/2015 | Theimer | |
| 2015/0248298 A1 | 9/2015 | Gavrilov | |
| 2015/0249579 A1 | 9/2015 | Ellsworth | |
| 2015/0286600 A1 | 10/2015 | Kaufmann | |
| 2015/0338909 A1 | 11/2015 | Woodruff | |
| 2016/0005444 A1 | 1/2016 | Chun | |
| 2016/0013973 A1 | 1/2016 | Onoue | |
| 2016/0072816 A1 | 3/2016 | Makhervaks | |
| 2016/0218929 A1 | 7/2016 | Bhuyan | |
| 2016/0285706 A1 | 9/2016 | Rao | |
| 2016/0301610 A1 | 10/2016 | Amit | |
| 2017/0005961 A1 | 1/2017 | Strandzhev | |
| 2017/0024261 A1 | 1/2017 | Atluri | |
| 2017/0083559 A1 | 3/2017 | Friedman | |
| 2017/0187629 A1 | 6/2017 | Shalev | |
| 2017/0212778 A1 | 7/2017 | Johnsen | |
| 2017/0214570 A1 | 7/2017 | Holen | |
| 2017/0214633 A1 | 7/2017 | Johnsen | |
| 2017/0214736 A1 | 7/2017 | Johnsen | |
| 2017/0214766 A1 | 7/2017 | Hoeg | |
| 2017/0214767 A1 | 7/2017 | Johnsen | |
| 2017/0339106 A1 | 11/2017 | Rimmer | |

FOREIGN PATENT DOCUMENTS

| | | |
|---|---|---|
| CN | 102763063 | 10/2012 |
| CN | 104871153 | 8/2015 |
| WO | 2013009846 | 1/2013 |

OTHER PUBLICATIONS

T. Hoefler, T. Mehlan, F. Mietke and W. Rehm, "Fast barrier synchronization for InfiniBand/spl trade/," Proceedings 20th IEEE International Parallel & Distributed Processing Symposium, Rhodes, Greece, 2006, pp. 7 (Year: 2006).*

S. Potluri, K. Hamidouche, A. Venkatesh, D. Bureddy and D. K. Panda, "Efficient Inter-node MPI Communication Using GPUDirect RDMA for InfiniBand Clusters with NVIDIA GPUs," 2013 42nd International Conference on Parallel Processing, Lyon, France, 2013, pp. 80-89 (Year: 2013).*

United States Patent and Trademark Office, Supplemental Notice of Allowability dated Apr. 30, 2021 for U.S. Appl. No. 15/417,265, 6 pages.

United States Patent and Trademark Office, Notice of Allowance and Fee(s) Due dated May 13, 2021 for U.S. Appl. No. 16/582,229, 12 pages.

United States Patent and Trademark Office, Notice of Allowance and Fee(s) Due dated Oct. 4, 2021 for U.S. Appl. No. 16/796,629, 10 pages.

Martyshkin, A.I. et al., "Queueing Theory to Describe Adaptive Mathematical Models of Computational Systems with Resource Virtualization and Model Verification by Similarly Configured Virtual Server" 2019 International Russian Automation Conference, © 2019, 6 pages.

United States Patent and Trademark Office, Notice of Allowance and Fee(s) Due dated May 10, 2022 for U.S. Appl. No. 16/717,173, 9 pages.

Mauch, Viktor et al., "High performance cloud computing", Future Generation Computing Systems 29 (2013), © 2012 Elsevier B.V., 1408-1416, 9 pages.

Guay, Wei Lin et al., "A Scalable Signalling Mechanism for VM Migration with SR-IOV over InfiniBand", 2012 IEEE 18th International Conference on Parallel and Distributed Systems, pp. 384-391, 8 pages.

Oden, Lena et al., "Infiniband-Verbs on GPU: A Case Study of Controlling an Infiniband Network Device from the GPU", 2014 IEEE 28th International Parallel & Distributed Processing Symposium Workshops (IPDPSM). Proceedings: 976-83; 796. IEEE Computer Society. (2014). 2 pages.

Liang, Shuang et al., "Swapping to Remote Memory over InfiniBand: An Approach using a High Performance Network Block Device", 2005 IEEE International Conference on Cluster Computing, Burlington, MA, 2005, 10 pages.

Zhou, Jiazheng et al., "Multicast in Fat-Tree-Based InfiniBand Networks", Proceedings of the 2005 Fourth IEEE International Symposium on Network Computing and Applications (NCA '05), 4 pages.

InfiniBandSM Trade Association, "InfiniBand™ Architecture Specification vol. 1 Release 1.3" Mar. 3, 2015 Final, Copyright © 2015 by InfiniBandSM Trade Association, 1842 pages.

Techlibrary, "Assigning a Fabric Profile to Devices and Ports- Technical Documentation-Support-Juniper Networks", Jan. 24, 2018, 4 pages, retrieved from: <https://www.juniper.net/documentation/en_US/junos-space-apps/network-director3.5/topics/task/configuration/fabric-profiles-assigning-editing.html>.

Benslimane, Abderrahim et al., "Dynamic Clustering-Based Adaptive Mobile Gateway Management in Integrated VANET-3G Heterogeneous Wireless Networks", IEEE Journal on Selected Areas in Communications, vol. 29, No. 3, Mar. 2011, © 2011, pp. 559-570.

Ho, Shen Ben "CMPE:Cluster-Management & Power-Efficient Protocol for Wireless Sensor Networks" A Thesis Presented to The Faculty of the Department of Computer Engineering San Jose State University, May 2004, 185 pages.

Kim, Kiyong et al., "A Leader Management Scheme for Fault-tolerant Multiple Subnets" 2009 Fifth International Joint Conference on INC, IMS and IDC, © 2009 IEEE, pp. 9-12.

Oracle®, An Oracle Technical White Paper, "Delivering Application Performance with Oracle's InfiniBand Technology", A Standards-Based Interconnect for Application Scalability and Network Consolation, May 2012, version 2.0, © 2012, 42 pages.

* cited by examiner

SYSTEM AND METHOD FOR SUPPORTING ON-DEMAND SETUP OF LOCAL HOST CHANNEL ADAPTER PORT PARTITION MEMBERSHIP IN A HIGH-PERFORMANCE COMPUTING ENVIRONMENT

CLAIM OF PRIORITY AND CROSS REFERENCE TO RELATED APPLICATIONS

This application is a continuation of U.S. patent application entitled "SYSTEM AND METHOD FOR SUPPORTING ON-DEMAND SETUP OF LOCAL HOST CHANNEL ADAPTER PORT PARTITION MEMBERSHIP IN A HIGH-PERFORMANCE COMPUTING ENVIRONMENT", application Ser. No. 15/417,265, filed Jan. 27, 2017 which application claims the benefit of priority to U.S. Provisional Patent Application entitled "SYSTEM AND METHOD FOR PROVIDING USING ADMIN PARTITIONS TO CORRELATE RESOURCE ACCESS AND OWNERSHIP IN A HIGH PERFORMANCE COMPUTING ENVIRONMENT", Application No. 62/287,712, filed on Jan. 27, 2016, which is hereby incorporated by reference in its entirety.

This application is related to the following patent applications, each of which is hereby incorporated by reference in its entirety:

U.S. patent application entitled "SYSTEM AND METHOD FOR CORRELATING FABRIC-LEVEL GROUP MEMBERSHIP WITH SUBNET-LEVEL PARTITION MEMBERSHIP IN A HIGH-PERFORMANCE COMPUTING ENVIRONMENT", application Ser. No. 15/415,620, filed Jan. 25, 2017;

U.S. patent application entitled "SYSTEM AND METHOD OF ASSIGNING ADMIN PARTITION MEMBERSHIP BASED ON SWITCH CONNECTIVITY IN A HIGH-PERFORMANCE COMPUTING ENVIRONMENT", application Ser. No. 15/415,644, filed Jan. 25, 2017;

U.S. patent application entitled "SYSTEM AND METHOD FOR DEFINING VIRTUAL MACHINE FABRIC PROFILES OF VIRTUAL MACHINES IN A HIGH-PERFORMANCE COMPUTING ENVIRONMENT", application Ser. No. 15/415,668, filed Jan. 25, 2017;

U.S. patent application entitled "SYSTEM AND METHOD OF HOST-SIDE CONFIGURATION OF A HOST CHANNEL ADAPTER (HCA) IN A HIGH-PERFORMANCE COMPUTING ENVIRONMENT", application Ser. No. 15/415,683, filed Jan. 25, 2017;

U.S. patent application entitled "SYSTEM AND METHOD OF INITIATING VIRTUAL MACHINE CONFIGURATION ON A SUBORDINATE NODE FROM A PRIVILEGED NODE IN A HIGH-PERFORMANCE COMPUTING ENVIRONMENT", application Ser. No. 15/415,698, filed Jan. 25, 2017;

U.S. patent application entitled "SYSTEM AND METHOD FOR APPLICATION OF VIRTUAL HOST CHANNEL ADAPTER CONFIGURATION POLICIES IN A HIGH-PERFORMANCE COMPUTING ENVIRONMENT", application Ser. No. 15/415,709, filed Jan. 25, 2017;

U.S. patent application entitled "SYSTEM AND METHOD FOR USING VIRTUAL MACHINE FABRIC PROFILES TO REDUCE VIRTUAL MACHINE DOWNTIME DURING MIGRATION IN A HIGH-PERFORMANCE COMPUTING ENVIRONMENT", application Ser. No. 15/417,281, filed Jan. 27, 2017;

U.S. patent application entitled "SYSTEM AND METHOD OF RESERVING A SPECIFIC QUEUE PAIR NUMBER FOR PROPRIETARY MANAGEMENT TRAFFIC IN A HIGH-PERFORMANCE COMPUTING ENVIRONMENT", application Ser. No. 15/417,289, filed Jan. 27, 2017; and U.S. patent application entitled "SYSTEM AND METHOD FOR INITIATING A FORCED MIGRATION OF A VIRTUAL MACHINE IN A HIGH-PERFORMANCE COMPUTING ENVIRONMENT", application Ser. No. 15/417,305, filed Jan. 27, 2017.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems, and is particularly related to on-demand setup of local host channel adapter ports as members of data partitions.

BACKGROUND

As larger cloud computing architectures are introduced, the performance and administrative bottlenecks associated with the traditional network and storage have become a significant problem. There has been an increased interest in using high performance lossless interconnects such as InfiniBand™ (IB) technology as the foundation for a cloud computing fabric. This is the general area that embodiments of the invention are intended to address.

SUMMARY

Described herein are systems and methods for dynamically assigning membership in a data partition to an end-port of a requesting host channel adapter. An exemplary embodiment can provide a subnet manager configured to operate within a subnet of a network fabric. The subnet can include a plurality of nodes, and the plurality of nodes can include at least one switch and a plurality of end-nodes, where the subnet manager executes on one of the plurality of nodes. A data store can also be provided, where the data store is accessible by the subnet manager. The data store can be configured to hold a first partition key (P_Key) that identifies a first partition, a second P_Key that identifies a second partition, and a subnet-unique end-port identifier. The data store can further be configured to maintain a first relationship between the first P_Key and the second P_Key, and a second relationship between the first P_Key and the subnet-unique end-port identifier. The subnet manager can receive a request for membership in the second partition for an end-port of a host channel adapter (HCA) of a requesting node. The request can comprise an identifier of the second partition and the subnet-unique end-port identifier, where the end-port of the HCA is uniquely identified in the subnet by the subnet-unique end-port identifier. The subnet manager can then request, from the data store, a first list of P_Keys related to the subnet-unique end-port identifier. The subnet manager can receive the first P_Key from the data store. The subnet manager can then request a second list of P_Keys related to the first P_Key from the data store. The subnet manager can receiving the second P_Key from the data store. The subnet manager can populate a P_Key table of the end-port of the HCA with the received second P_Key.

DETAILED DESCRIPTION

Figure 1:
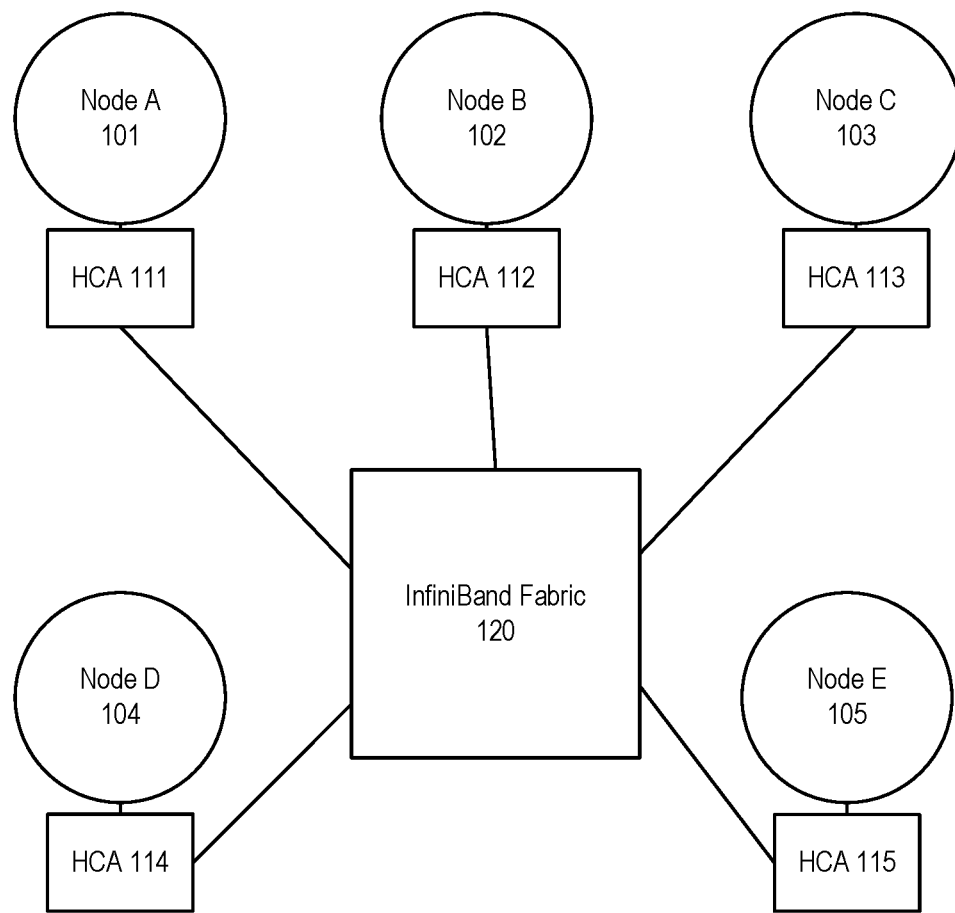
FIG. 1 shows an illustration of an InfiniBand™ environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods for supporting on-demand setup of local host channel adapter ports as members of data partitions.

The following description of the invention uses an InfiniBand™ (IB) network as an example for a high performance network. Throughout the following description, reference can be made to the InfiniBand™ specification (also referred to variously as the InfiniBand specification, IB specification, or the legacy IB specification). Such reference is understood to refer to the InfiniBand® Trade Association Architecture Specification, Volume 1, Version 1.3, released March, 2015, available at http://www.inifinibandta.org, which is herein incorporated by reference in its entirety. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

InfiniBand™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end-nodes and switches, and receive notifications from SMAs.

In accordance with an embodiment, intra-subnet routing in an IB network can be based on linear forwarding tables (LFTs) stored in the switches. The LFTs are calculated by the SM according to the routing mechanism in use. In a subnet, Host Channel Adapter (HCA) ports on the end nodes and switches are addressed using local identifiers (LIDs). Each entry in a linear forwarding table (LFT) consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigures the network accordingly.

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets in which the network changes occurred. Also, the segmenting of a large fabric with routers may limit the reconfiguration scope.

An example InfiniBand™ fabric is shown in FIG. 1, which shows an illustration of an InfiniBand™ environment 100, in accordance with an embodiment. In the example shown in FIG. 1, nodes A-E, 101-105, use the InfiniBand™ fabric 120 to communicate, via the respective host channel adapters 111-115. In accordance with an embodiment, the various nodes, e.g., nodes A-E 101-105, can be represented by various physical devices. In accordance with an embodiment, the various nodes, e.g., nodes A-E 101-105, can be represented by various virtual devices, such as virtual machines.

Data Partitions in InfiniBand™

In accordance with an embodiment, IB networks can support partitioning as a security mechanism to provide for isolation of logical groups of systems sharing a network fabric. Each HCA port on a node in the fabric can be a member of one or more partitions. In accordance with an embodiment, the present disclosure provides for two types of partitions that can be defined within an IB subnet—data partitions (discussed in detail in the following paragraphs) and admin partitions (discussed in detail later in the disclosure).

Data partition memberships are managed by a centralized partition manager, which can be part of the SM. The SM can configure data partition membership information on each port as a table of 16-bit partition keys (P_Keys). The SM can also configure switch and router ports with the data partition enforcement tables containing P_Key information associated with the end-nodes that send or receive data traffic through these ports. Additionally, in a general case, data partition membership of a switch port can represent a union of all membership indirectly associated with LIDs routed via the port in an egress (towards the link) direction.

In accordance with an embodiment, data partitions are logical groups of ports such that the members of a group can only communicate to other members of the same logical group. At host channel adapters (HCAs) and switches, packets can be filtered using the data partition membership information to enforce isolation. Packets with invalid partitioning information can be dropped as soon as the packets reaches an incoming port. In partitioned IB systems, data partitions can be used to create tenant clusters. With data partition enforcement in place, a node cannot communicate with other nodes that belong to a different tenant cluster. In this way, the security of the system can be guaranteed even in the presence of compromised or malicious tenant nodes.

In accordance with an embodiment, for the communication between nodes, Queue Pairs (QPs) and End-to-End contexts (EECs) can be assigned to a particular data partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a data partition.

Figure 2:
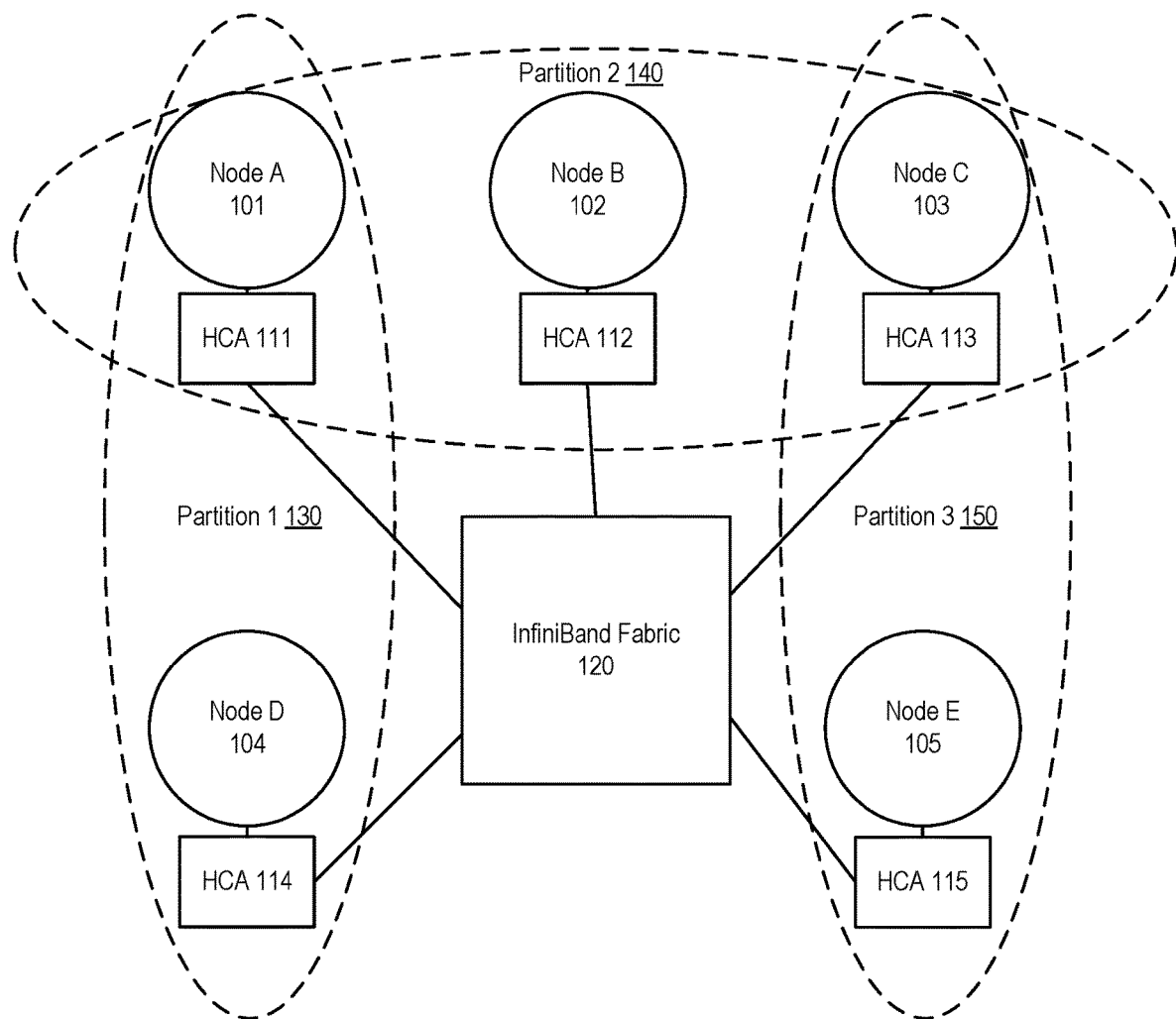
FIG. 2 shows an illustration of a partitioned cluster environment, in accordance with an embodiment

An example of IB data partitions is shown in FIG. 2, which shows an illustration of a data partitioned cluster environment, in accordance with an embodiment. In the example shown in FIG. 2, nodes A-E, 101-105, use the InfiniBand™ fabric, 120, to communicate, via the respective host channel adapters 111-115. The nodes A-E are arranged into data partitions, namely data partition 1, 130, data partition 2, 140, and data partition 3, 150. Data partition 1 comprises node A 101 and node D 104. Data partition 2 comprises node A 101, node B 102, and node C 103. Data partition 3 comprises node C 103 and node E 105. Because of the arrangement of the data partitions, node D 104 and node E 105 are not allowed to communicate as these nodes do not share a data partition. Meanwhile, for example, node A 101 and node C 103 are allowed to communicate as these nodes are both members of data partition 2, 140.

Virtual Machines in InfiniBand™

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand™ (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IOV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 3:
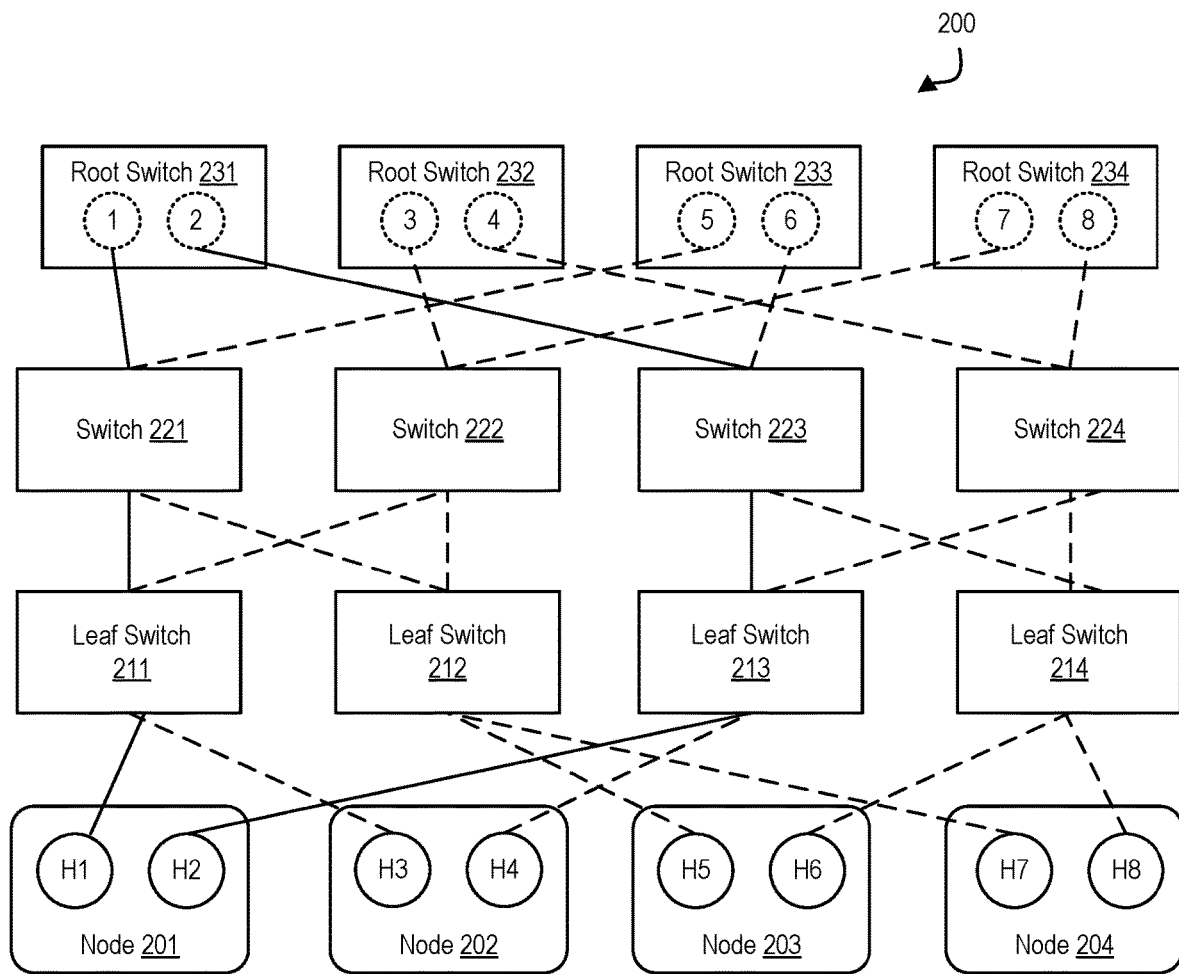
FIG. 3 shows an illustration of a tree topology in a network environment, in accordance with an embodiment.

FIG. 3 shows an illustration of a tree topology in a network environment, in accordance with an embodiment. As shown in FIG. 3, one or more end-nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 3, each of the end-nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end-nodes, and thus the corresponding routes, to each switch port. For the end-nodes connected to the same leaf switch, the indexing order can depend on the switch port to which the end-node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common data partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the data partitions, fat-tree routed subnets, in general, provide poor isolation among data partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end-nodes and $n \cdot k^{n-1}$ switches, each with 2k ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.

Input/Output (I/O) virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment, or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand™ and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand™ SR-IOV Architecture—Shared Port

There can be different types of SR-IOV models, e.g. a shared port model, a virtual switch model, and a virtual port model.

Figure 4:
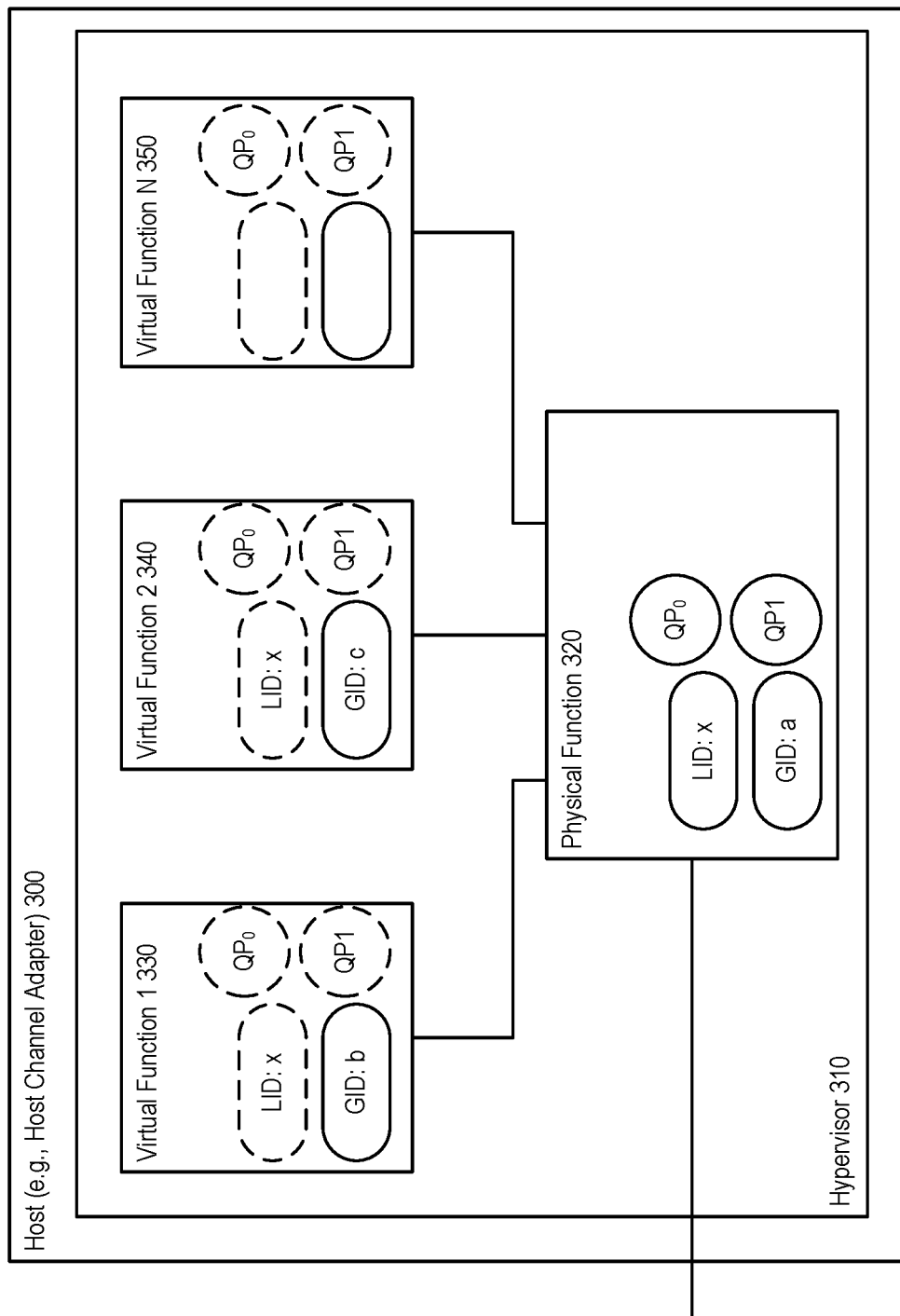
FIG. 4 shows an exemplary shared port architecture, in accordance with an embodiment.

FIG. 4 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 4, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 4, in accordance with an embodiment, different GIDs can be assigned to the virtual functions and the physical function, and the special queue pairs, QP0 and QP1 (i.e., special purpose queue pairs that are used for InfiniBand™ management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand™ SR-IOV Architecture Models—Virtual Switch (vSwitch)

Figure 5:
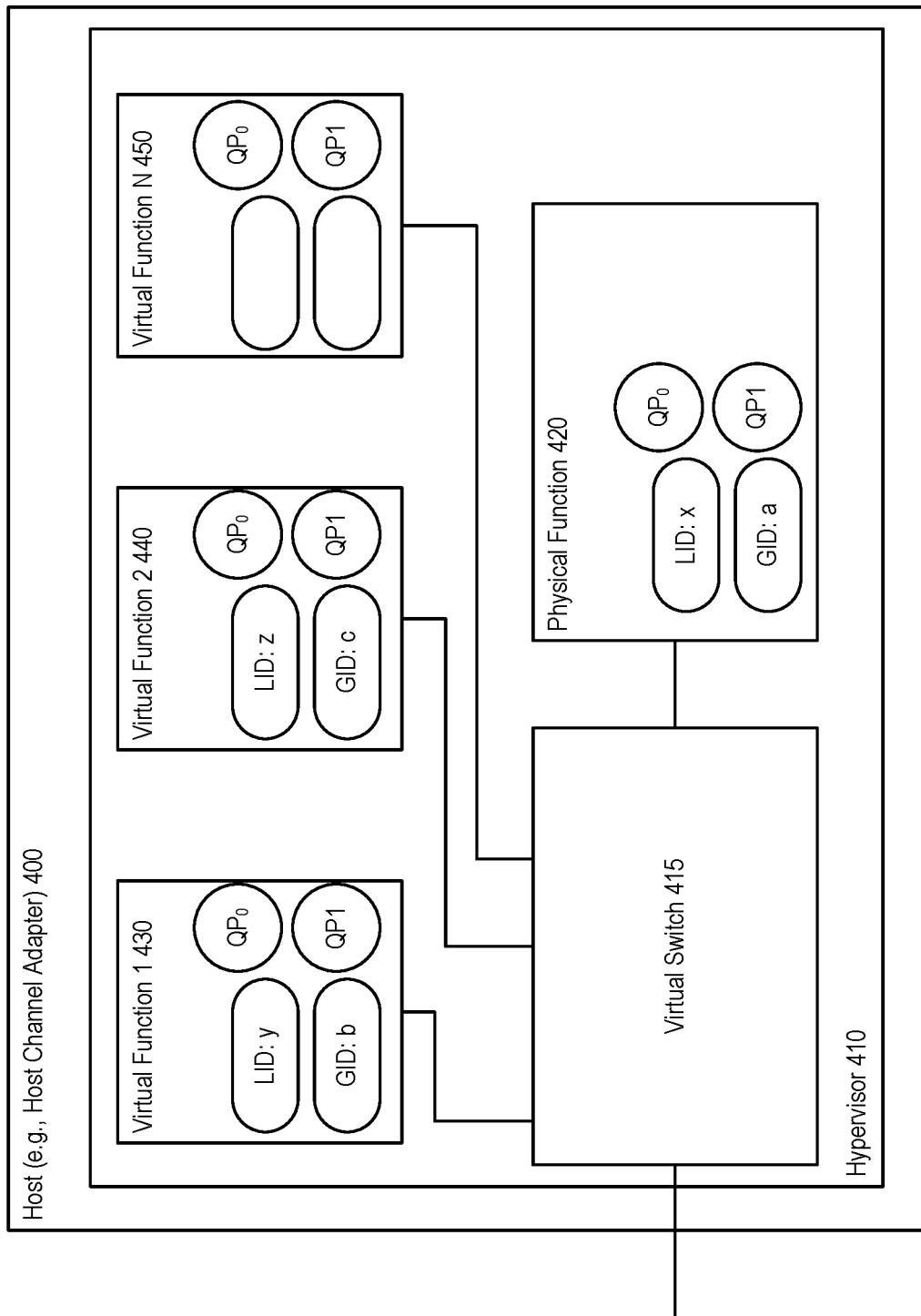
FIG. 5 shows an exemplary vSwitch architecture, in accordance with an embodiment.

FIG. 5 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand™ SR-IOV Architecture Models—Virtual Port (vPort)

Figure 6:
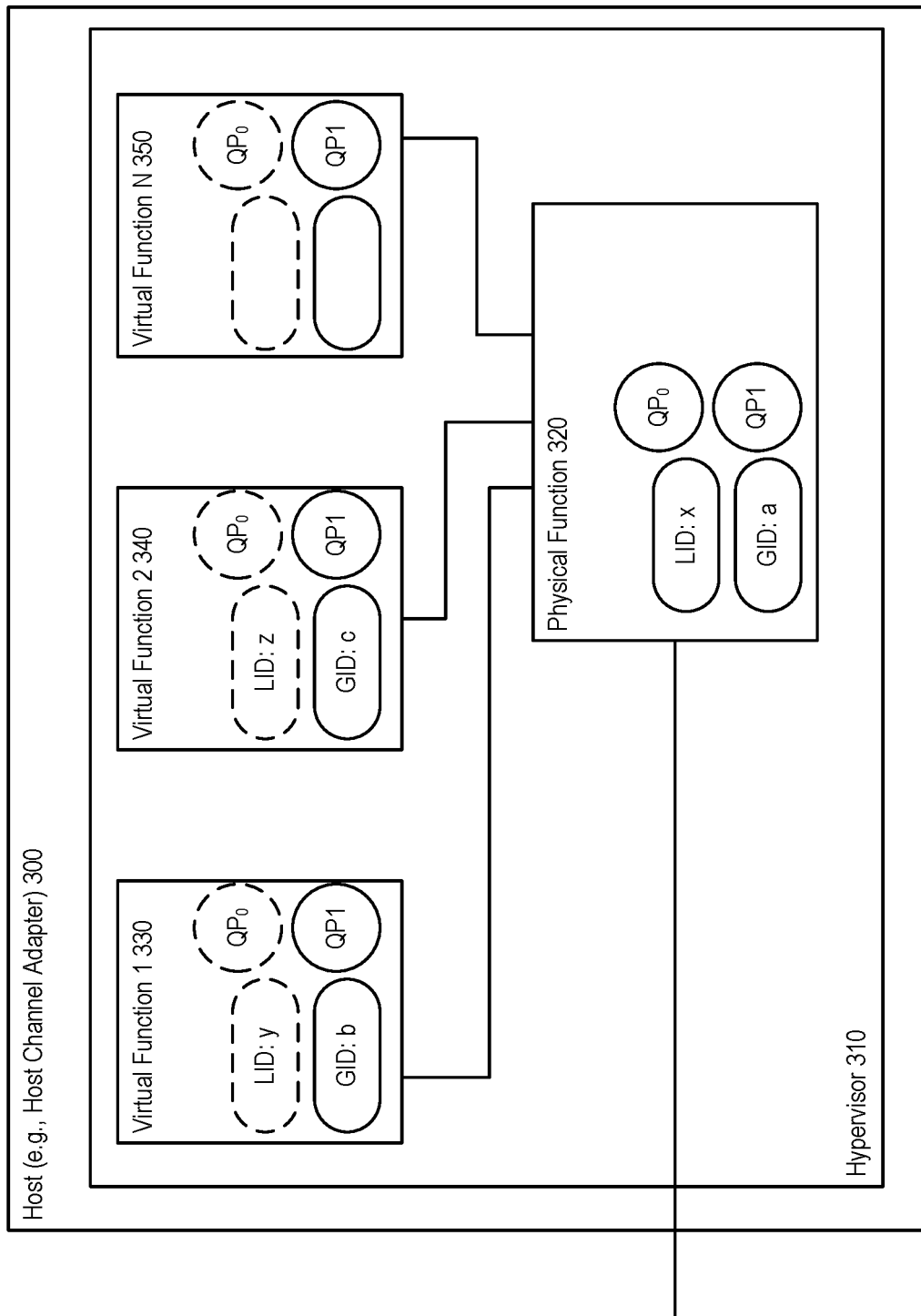
FIG. 6 shows an exemplary vPort architecture, in accordance with an embodiment.

FIG. 6 shows an exemplary vPort concept, in accordance with an embodiment. As depicted in the figure, a host 300 (e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. With the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand™ SR-IOV Architecture Models—vSwitch with Prepopulated LIDs

In accordance with an embodiment, the present disclosure provides a system and method for providing a vSwitch architecture with prepopulated LIDs.

Figure 7:
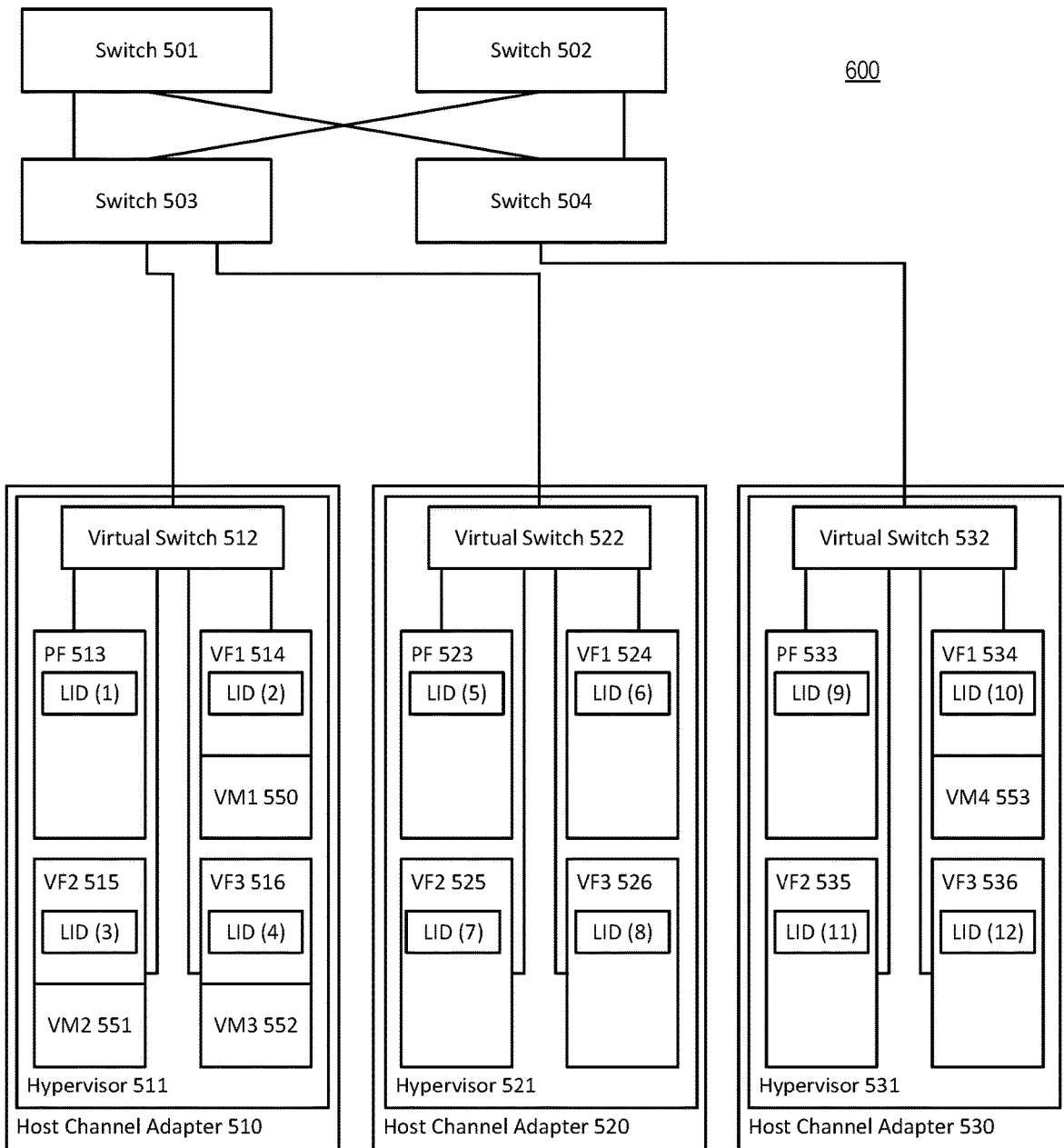
FIG. 7 shows an exemplary vSwitch architecture with prepopulated LIDs, in accordance with an embodiment.

FIG. 7 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand™ fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 7, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 7.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are smaller since each switch, router, or dedicated SM node in the IB subnet consumes a LID as well). Note that the vSwitch does not need to occupy an additional LID as it can share the LID with the PF.

In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand™ SR-IOV Architecture Models—vSwitch with Dynamic LID Assignment

In accordance with an embodiment, the present disclosure provides a system and method for providing a vSwitch architecture with dynamic LID assignment.

Figure 8:
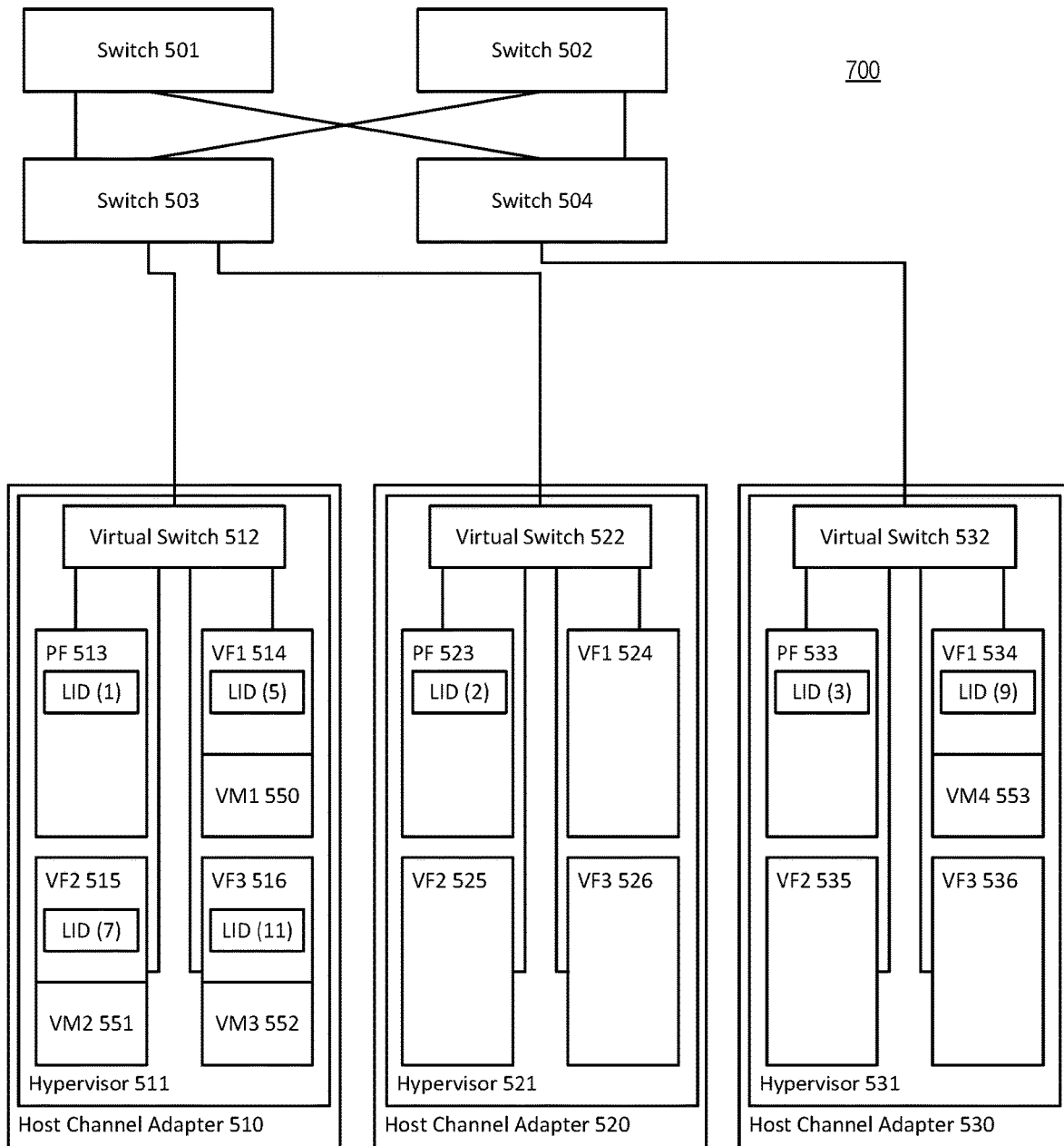
FIG. 8 shows an exemplary vSwitch architecture with dynamic LID assignment, in accordance with an embodiment.

FIG. 8 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand™ fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 8, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 9:
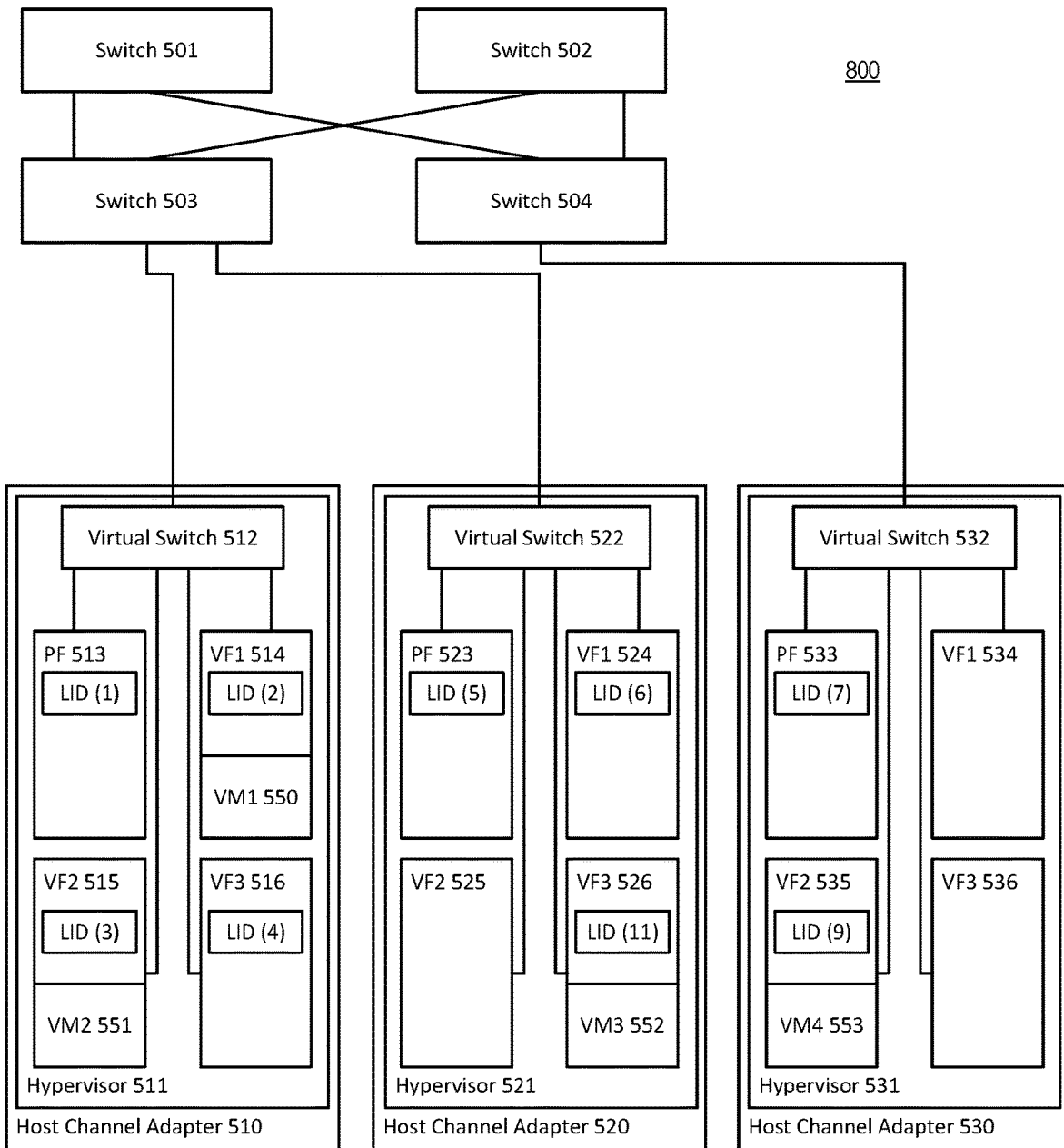
FIG. 9 shows an exemplary vSwitch architecture with vSwitch with dynamic LID assignment and prepopulated LIDs, in accordance with an embodiment.

InfiniBand™ SR-IOV Architecture Models—vSwitch with Dynamic LID Assignment and Prepopulated LIDs FIG. 9 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand™ fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 9, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 9, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs<=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

InfiniBand™—Inter-Subnet Communication

In accordance with an embodiment, in addition to providing an InfiniBand™ fabric within a single subnet, embodiments of the current disclosure can also provide for an InfiniBand™ fabric that spans two or more subnets.

Figure 10:
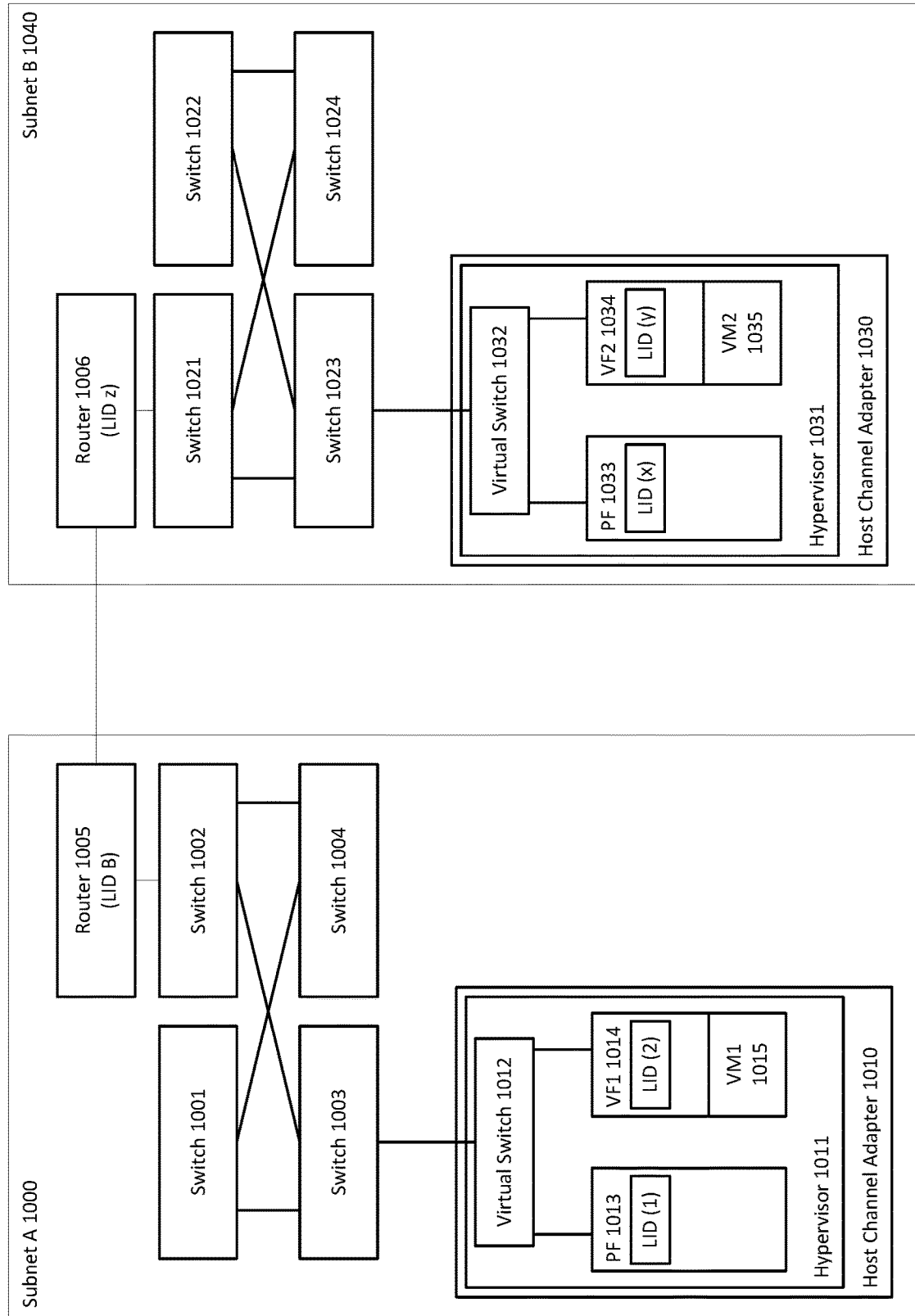
FIG. 10 shows an exemplary multi-subnet InfiniBand™ fabric, in accordance with an embodiment.

FIG. 10 shows an exemplary multi-subnet InfiniBand™ fabric, in accordance with an embodiment. As depicted in the figure, within subnet A 1000, a number of switches 1001-1004 can provide communication within subnet A 1000 (e.g., an IB subnet) between members of a fabric, such as an InfiniBand™ fabric. The fabric can include a number of hardware devices, such as, for example, channel adapter 1010. Host channel adapters 1010 can in turn interact with a hypervisor 1011. The hypervisor can, in turn, in conjunction with the host channel adapter it interacts with, setup a number of virtual functions 1014. The hypervisor can additionally assign virtual machines to each of the virtual functions, such as virtual machine 1 1015 being assigned to virtual function 1 1014. The hypervisor can access their associated host channel adapters through a fully featured physical function, such as physical function 1013, on each of the host channel adapters.

With further reference to FIG. 10, and in accordance with an embodiment, a number of switches 1021-1024 can provide communication within subnet B 1040 (e.g., an IB subnet) between members of a fabric, such as an InfiniBand™ fabric. The fabric can include a number of hardware devices, such as, for example, host channel adapter 1030. Host channel adapter 1030 can in turn interact with a hypervisor 1031. The hypervisor can, in turn, in conjunction with the host channel adapter it interacts with, setup a number of virtual functions 1034. The hypervisors can additionally assign virtual machines to each of the virtual functions, such as virtual machine 2 1035 being assigned to virtual function 2 1034. The hypervisor can access their associated host channel adapters through a fully featured physical function, such as physical function 1033, on each of the host channel adapters. It is noted that, although only one host channel adapter is shown within each subnet (i.e., subnet A and subnet B), it is to be understood that a plurality of host channel adapters, and their corresponding components, can be included within each subnet.

In accordance with an embodiment, each of the host channel adapters can additionally be associated with a virtual switch, such as virtual switch 1012 and virtual switch 1032, and each HCA can be set up with a different architecture model, as discussed above. Although both subnets within FIG. 10 are shown as using a vSwitch with prepopulated LID architecture model, this is not meant to imply that all such subnet configurations must follow a similar architecture model.

In accordance with an embodiment, at least one switch within each subnet can be associated with a router, such as switch 1002 within subnet A 1000 being associated with router 1005, and switch 1021 within subnet B 1040 being associated with router 1006.

In accordance with an embodiment, when traffic at an originating source, such as virtual machine 1 within subnet A, is addressed to a destination at a different subnet, such as virtual machine 2 within subnet B, the traffic can be addressed to the router within subnet A, i.e., router 1005, which can then pass the traffic to subnet B via its link with router 1006.

Fabric Manager

As discussed above, a network fabric, such as an InfiniBand™ fabric, can span a plurality of subnets through the use of interconnected routers in each subnet of the fabric. In accordance with an embodiment, a fabric manager (not shown) can be implemented on a host which is a member of the network fabric and can be employed within the fabric to manage both physical and logical resources that are part of the fabric. For instance, management tasks such as discovering fabric resources, controlling connectivity between physical servers, collecting and viewing real-time network statistics, disaster recovery, and setting quality of service (QoS) settings, among others, may be performed by a user through the fabric manager. In accordance with an embodiment, the fabric manager may span all subnets defined in the fabric. That is, the fabric manager can manage physical and logical resources that are members of, or associated with, the fabric at large, regardless of which subnet the resources are a member of.

In accordance with an embodiment, the fabric manager can include a graphical user interface (GUI) through which a user can perform administration functions. The fabric manager GUI can incorporate visualization tools that allow a user to monitor and control fabric resources. For example, in an embodiment, a user can view server connections, configuration settings and performance statistics for servers across the fabric through the fabric interface. Other examples of fabric functionality that can be monitored and/or managed through the fabric manger GUI include discovering inter-subnet fabric topology, viewing visual representations of these topologies, creating fabric profiles (e.g., virtual machine fabric profiles), and building and management of a fabric manager database that can store fabric profiles, metadata, configuration settings and other data required by, and related to, the network fabric. In accordance with an embodiment, the fabric manager database is a fabric-level database.

In addition, the fabric manager can define legal inter-subnet connectivity in terms of which subnets are allowed to communicate via which router ports using which partition numbers. In accordance with an embodiment, the fabric manager is a centralized fabric management utility. The above examples are not meant to be limiting.

In accordance with an embodiment, some of the fabric manager's functionality can be initiated by a user, and other functionality can be abstracted from the user, or be automated (e.g., some functionality may be performed by the fabric manager upon startup, or at other predetermined events).

In an exemplary embodiment of a management event, a user may initiate, at the fabric manger interface, a configuration change directed towards a network fabric device. After receiving the configuration change request, the fabric manager may, in turn, ensure that the configuration change request is properly carried out. For example, the fabric manager may communicate the request to the device and ensure that the configuration change is written to the device's configuration. In one embodiment, the physical device acknowledges to the fabric manager that the configuration change has successfully completed. In accordance with an embodiment, the fabric manager may then update the interface to give a visual confirmation that the request has been carried out. Further, the fabric manager may persist the configuration of the device to the fabric manager database, e.g., for disaster recovery or other purposes.

In accordance with an embodiment, the fabric manager can have other interfaces, such as a command line interface, that includes some, all, or more functionality than the GUI.

Fabric-Level Resource Domains

As discussed above, a fabric manager can allow users to perform administrative tasks throughout the network fabric through an interface of the fabric manager. In accordance with an embodiment, an additional function of the fabric manager is facilitation of hierarchical role-based access control. In an embodiment, role-based access control is achieved through fabric-level resource domains.

In accordance with an embodiment, role-based access control is based on the concept of fabric users. Access from both human administrators and external management applications can represent an authenticated context that defines legal operations on all or a subset of the fabric infrastructure or fabric resources. For example, a user can be represented in the fabric by a user profile. That is, within the fabric a user can be defined by creating a profile of the user and assigning attributes to the profile. A user profile can be assigned a username attribute, and a password attribute, where the username is unique within the fabric, thereby uniquely identifying the user. Further, the user profile may be associated with certain roles defined in the fabric that assign certain access levels to different resources within the fabric. In accordance with an embodiment, setting up user profiles can be accomplished through the fabric manager interface. All or part of the user profile can be stored in the fabric manger database. Moreover, in an embodiment, the fabric manager can integrate with well-known user directories, such as Microsoft's® Active Directory or LDAP directories, or with, e.g., the RADIUS networking protocol for remote authentication.

In accordance with an embodiment, the fabric manager can manage fabric resources that it discovers through fabric-level resource domains (also referred to as "resource domains", or simply "domains" herein). A resource domain is a logical grouping of fabric resources defined at the fabric level. Fabric resources include both physical and logical resources. Some examples of resources include fabric devices (such as HCAs, physical nodes, and switches), fabric profiles (such as virtual machine fabric profiles, and user profiles), virtual machines, clouds, and I/O modules, among others.

In accordance with an embodiment, all fabric resources discovered and managed by the fabric manager reside in the default domain, which exists by default (i.e., without the need to setup or configure it) in the fabric, and can be accessed through the fabric manager interface. The default domain is the highest level domain—that is, it is the parent domain to all other resource domains, and all other resource domains exist within the default domain. The default domain is associated with a fabric-level administrator, which also exists by default, and is configured with administrative privileges in the default domain by default.

In accordance with an embodiment, resource domains represent a hierarchical form of resource management. For example, the process of configuring and managing the default domain is available only to the fabric-level administrator. However, child domains can be created within the default domain by the fabric-level administrator. For instance, the fabric-level administrator can create a child domain and can add domain resources to the child domain. Additionally the fabric-level administrator can create domain-level "domain admin" users and add (i.e., associate)

the domain admin users to the child domain. Making the domain admin user a member of the resource domain allows the domain admin user to manage the child domain and its contained subset of the fabric resources. In accordance with an embodiment, the domain admin user cannot manage resources outside of the child domain (i.e., resources at a parallel or a higher level than the domain admin is associated with). However the domain admin can manage resources contained in resource domains that have been created as child domains of the resource domain. In accordance with an embodiment, the fabric manager is responsible for providing the security that ensures that resource domain boundaries are strictly enforced.

Figure 11:
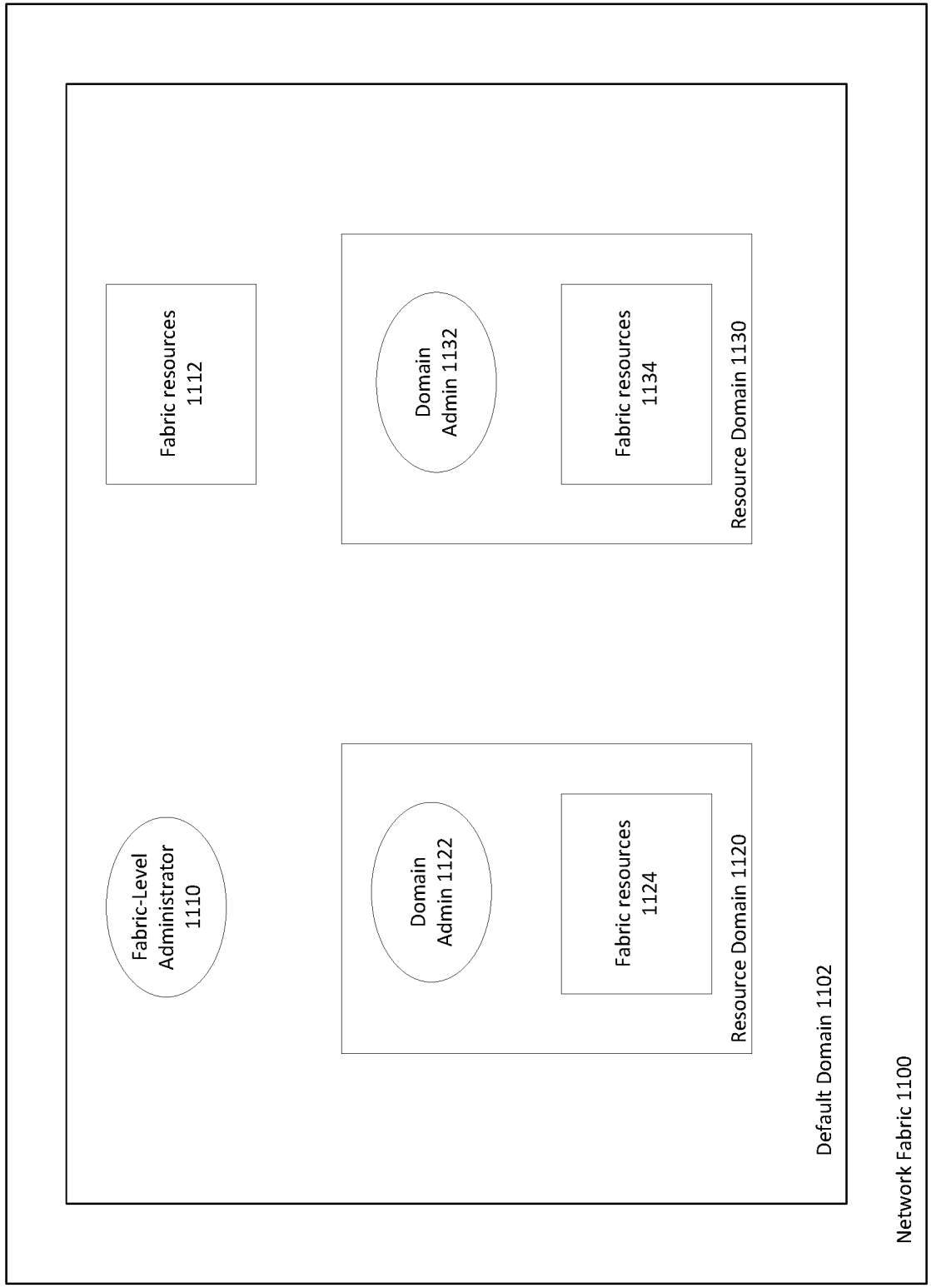
FIG. 11 shows an exemplary InfiniBand™ fabric and subnet including exemplary physical and logical subnet resources, in accordance with an embodiment.

FIG. 11 shows the hierarchical structure of resource domains. As shown, default domain 1102 exists within network fabric 1100. Fabric-level administrator 1110 has access rights to manage fabric-level resources 1112, 1124, and 1134. Fabric-level administrator 1110 can also create and administer new resource domains within default domain 1102. Fabric-level administrator 1110 has created resource domain 1120 and 1130, and corresponding domain-level domain admin users 1122 and 1132. Domain admin user 1122 has access rights to manage fabric resources 1124 (assigned to resource domain 1120 by fabric-level administrator 1110), but has no access rights to manage fabric resources 1112 (at a higher level) or domain resources 1134 (at a parallel level). Likewise, Domain admin user 1132 has access rights to manage fabric resources 1134 (assigned to resource domain 1130 by Fabric-level administrator 1110), but has no access rights to manage fabric resources 1112 (at a higher level) or domain resources 1124 (at a parallel level).

Admin Partitions

In accordance with an embodiment, a resource domain can be represented at the subnet level by an administration, or "admin" partition (as they are referred to herein). An admin partition represents a group membership which grants access rights at the subnet level to subnet resources. Members of an admin partition are considered privileged, in that the members have access rights to any subnet resources that are associated with the admin partition, in accordance with an embodiment. At the fabric manager level, an admin partition is associated with a resource domain and a corresponding domain admin user. Thus, user-role separation can be ensured in multi-tenant environments at the subnet level. Further, resource domain membership can be correlated with admin partition membership, so that resources that are members of an admin partition that is associated with a particular resource domain are also members of the resource domain.

In accordance with an embodiment, an admin partition can be defined at the subnet level in the same way that a data partition is defined, but with an additional attribute specifying that the partition being created is an admin partition. Like data partitions (discussed in detail, above), admin partitions can be created by an administrator through the fabric manager interface, in accordance with an embodiment. In an embodiment, the fabric manager can support an "admin partition" flag as an optional parameter during the creation of a partition. If selected by the creating administrator, the fabric manager will include the additional attribute specifying that the newly created partition is an admin partition, and will be treated as an admin partition by the fabric manager and the local master subnet manager.

In accordance with an embodiment, the fabric manager can be configured to automatically create a corresponding admin partition for each resource domain that is created, and associate the automatically created partition with the corresponding resource domain. In such an embodiment, when fabric-level resources are added to the resource domain, the fabric manager also associates them with the admin partition that was automatically created and associated with the resource domain. Thus, resources added to the resource domain will have subnet-level access rights to each other upon being added to the resource domain, with no further action being taken by the administrator (e.g., the fabric-level administrator or the domain admin).

Moreover, in accordance with an embodiment, entire subnets of the network can represent a special resource domain in a domain hierarchy that has a top-level domain (e.g., the default domain). For instance, in a domain hierarchy, where the default domain represents the top-level domain, each subnet of the network fabric can then be recognized by the fabric manager as a child domain of the default domain. Recognition of entire subnets as child domains of a top-level domain can be configured as default behavior of the fabric manager, or these default domains can be manually defined by an administrator. Here again, in order to have user role separation and enforcement of domain boundaries and resource associations at the subnet level, admin partitions corresponding to entire-subnet resource domains can be defined. In accordance with an embodiment, an admin partitions that is defined in a subnet and includes each resource in that subnet (as either a member, or associated with the admin partition) can be termed a "domain global" admin partition, since in this configuration, every resource in the subnet would have access rights to every other resource.

In accordance with an embodiment, an admin partition can be transparent to a domain admin. As noted above, a domain global admin partition can be created automatically for a resource domain at the fabric manager level, and then all resources assigned to or created within the scope of this domain can automatically be associated with the corresponding admin partition. In another embodiment, however, the domain admin can explicitly create different admin partitions within the relevant resource domain, and then resources within the domain can be explicitly associated with the explicitly created admin partition instead of with the admin partition that was created by default for the resource domain.

In accordance with an embodiment, the fabric manager can support the creation of both shared and private admin partitions. Admin partitions created by a fabric-level administrator in the default domain can be shared partitions that can be made available to individual resource domains. Admin partitions created by a domain admin (i.e., a user with credentials associated with a specific resource domain) in the domain in which the domain admin is a member can be private partitions associated with and available only to the specific resource domain in whose context the admin partitions were created.

In accordance with an embodiment, end-ports of HCAs and vHCAs can be members of an admin partition, just as they can be members of a data partition. Admin partitions are differentiated from data partitions, however, in that admin partitions can be associated with other subnet resources, in accordance with an embodiment. For example, a data partition can be associated with an admin partition. Further, an admin partition can be associated with another admin partition, as a child or as a parent, thus making admin partitions a hierarchical concept and able to correspond with the hierarchy of the resource domains they are associated with, in accordance with an embodiment.

As a technical matter, end-ports of HCAs (and vHCAs) can be referred to as "members" of partitions, in traditional terminology, and other resources can be "associated with" admin partitions, in accordance with an embodiment. The technical differences in these two concepts are explained below. For convenience and readability, however, this document may occasionally, in reference to admin partitions, use the terms "member" and "associated with" interchangeably. Notwithstanding the use of these terms interchangeably, it is to be understood that the technical differences between end-port/HCA membership in, and resource association with, admin partitions is meant to be consistently applied by the reader.

In accordance with an embodiment, an admin partition is defined by a P_Key, just as a data partition is defined. However, while an end-port is aware of the data partitions that it is a member of, it is not necessary that end-ports be aware of what admin partitions they are members of. Thus, in one embodiment, a P_Key defining an admin partition is not entered in the P_Key table of member end-ports. In this way the creation of an admin partition does not waste P_Key table entries—which are a limited resource—if an admin partition is not used for IB packet traffic. In another embodiment, however, an admin partition may function as both an admin partition and a data partition. In such an embodiment, all P_Key tables of end-ports that are members of the admin partition can have a P_Key entry for the admin partition in their respective P_Key tables. In accordance with an embodiment, a data partition may be defined as any partition that is not also an admin partition.

Admin Partition to Data Partition Associations

In accordance with an embodiment, a data partition can be associated with one or more admin partitions. For example, a data partition, being defined by a P_Key value, can be associated with an admin partition that is defined by its own distinct P_Key value. Moreover, the data partition can be associated with a second admin partition defined by yet another distinct P_Key value. In accordance with an embodiment, the association of a data partition with a specific admin partition can define a maximum membership level for end-ports that are members of the specific admin partition.

As noted above, an admin partition represents a group membership which grants access rights to subnet resources. In accordance with an embodiment, any end-port member of an admin partition has access rights to any subnet resource that is associated with the same admin partition based solely on the end-port's membership in the admin partition. Thus, any end-port that is a member of an admin partition has access rights to any data partition that is associated with that same admin partition. Notably, this does not necessarily mean that the member end-port is a member of the associated data partition, but that it has access rights to the associated data partition, and therefore could be a member of the data partition.

Such a scheme obviates the need for administrators to grant end-ports access to, e.g., data partitions by manually including the data partition's P_Key in the P_Key table of the end-port. In an embodiment, when an end-port is initialized in the subnet, the master subnet manager can query a data store (e.g., an admin partition registry, as discussed below) that holds admin partition definitions (e.g., P_Keys), and relationships that define membership in the defined admin partitions and that define associations with the defined admin partitions, to determine which admin partitions the end-port is a member of. The subnet manager can then further check to see if there are any data partitions associated with the admin partitions of which the end-port is a member. If the SM finds that 1) the end-port is a member of an admin partition, and 2) that that admin partition is associated with a data partition, then the SM can automatically place the P_Key of the associated data partition in the P_Key table of the end-port, thereby automatically granting the end-port access to the data partition. Thus, the admin partition represents a simpler, more scalable solution than manual partition mapping by administrators.

Figure 12:
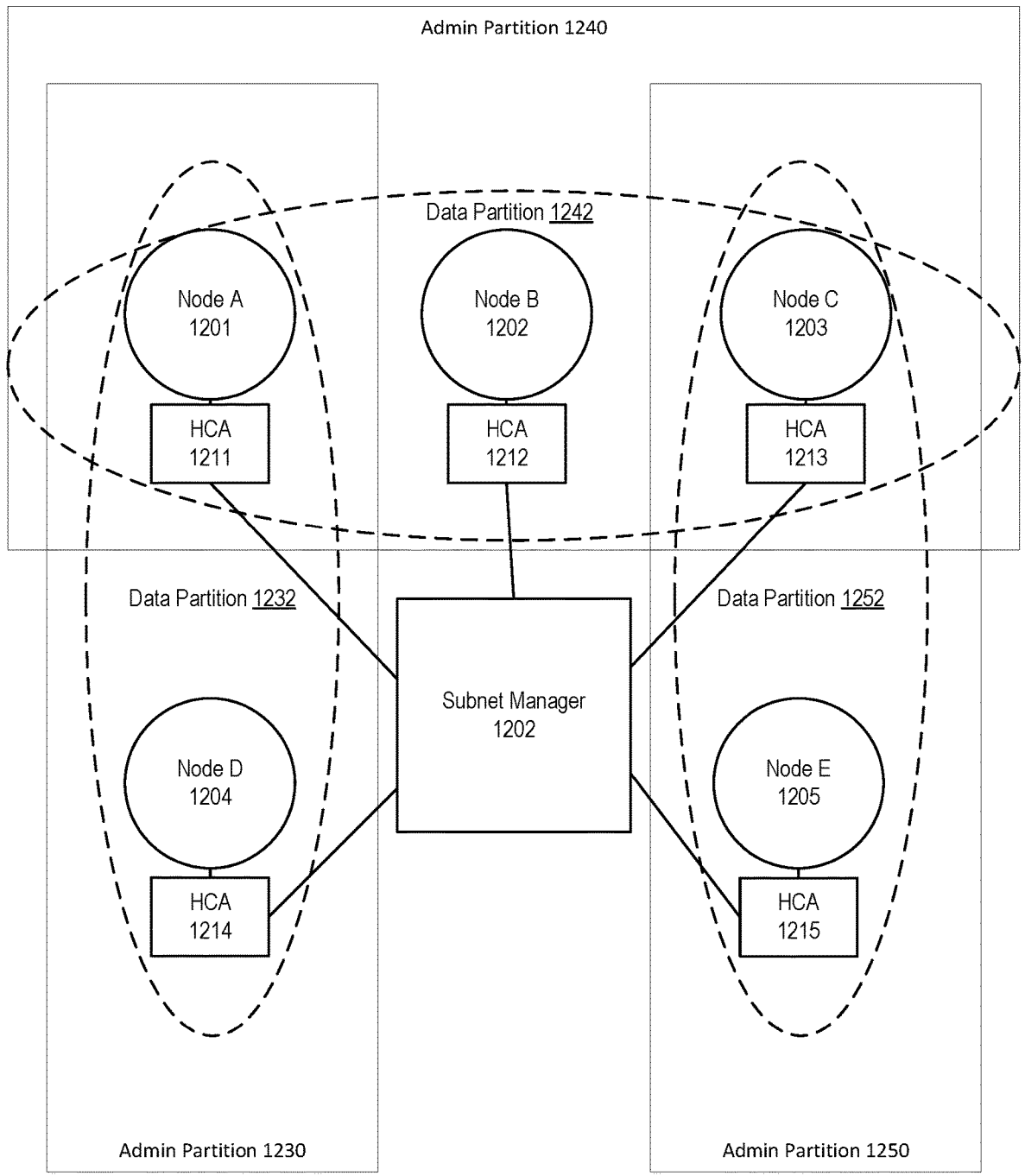
FIG. 12 shows an exemplary network fabric having both admin partitions and data partitions, in accordance with an embodiment.

FIG. 12 shows an exemplary network fabric having both admin partitions and data partitions. As shown in FIG. 12, admin partitions 1230, 1240, and 1250 have been defined within the fabric. Nodes A-E 1201-1205, are physically connected to the fabric by their respective HCAs 1211-1215. Additionally, each HCA is a member of at least one admin partition. HCA 1211 and HCA 1214 are members of admin partition 1230. HCA 1211 is also a member of admin partition 1240, along with HCAs 1212 and 1213. HCA 1213 is, additionally, a member of admin partition 1250, along with HCA 1215.

With further reference to FIG. 12, and in accordance with an embodiment, data partitions 1232, 1242, and 1252 have been defined within the fabric. Data partition 1232 is associated with admin partition 1230, data partition 1242 is associated with admin partition 1240, and data partition 1252 is associated with admin partition 1250. In accordance with an embodiment, HCA 1211 and HCA 1214 have access rights to membership in data partition 1232 based on their membership in admin partition 1230. Likewise, HCAs 1211-1213 have access rights to membership in data partition 1242 based on their membership in admin partition 1240. Moreover, HCAs 1213 and 1215 have access rights to membership in data partition 1252 based on their membership in admin partition 1250.

In accordance with an embodiment, a subnet manager (e.g., the master subnet manager) can have access to stored data defining both 1) which end-ports in a subnet are members of which admin partitions defined within the subnet, and 2) which data partitions defined within the subnet are associated with which admin partitions defined within the subnet. Access to such information can allow the SM to respond to dynamic requests for membership in data partitions from end-ports. The ability of an end-port (through its HCA) to dynamically request, and a SM to dynamically grant (or deny), end-port membership in a data partition obviates the need for an administrator to explicitly grant end-ports access to data partitions by manually including the data partition's P_Key in the P_Key table of the end-port. As a result, administrative overhead is significantly lowered.

As noted above, a SM can have access to defined admin-partition-to-data-partition associations, and to information defining end-port membership within admin partitions (collectively, this information will occasionally be referred to herein as "Admin Partition Association Information"). In accordance with an embodiment, Admin Partition Association Information can be defined and persisted so as to facilitate SM access to the Admin Partition Association Information. For instance, as discussed above, admin partitions and data partitions are represented at the subnet level by P_Keys. For a given admin partition defined by a P_Key in a subnet, there can exist one or more relationships that map one or more respective data partitions, also defined by a P_Key in the subnet, to the given admin partition. This (admin partition) P_Key to (data partition) P_Key relationship can define an association of the data partition with the given admin partition, and the relationship is included as a component of the Admin Partition Association Information.

As discussed above, the Admin Partition Association Information can also include information defining end-port membership within admin partitions. In accordance with an embodiment, and as previously noted, an end-port is represented at the subnet level by a GUID (or a vGUID, if the end-port is that of a vHCA—however, the format of a GUID and a vGUID can be identical, and therefore can appear the same to a SM, in accordance with an embodiment). Thus, end-port membership in an admin partition can be defined at the subnet level through a GUID to admin partition P_Key relationship, in accordance with an embodiment.

Moreover, and in accordance with an embodiment, the Admin Partition Association Information that defines admin-partition-to-data-partition associations, and end-port membership in admin partitions within a subnet, can be stored in any suitable format that allows a SM to access the information stored therein. For instance, in an exemplary embodiment, the P_Keys can be mapped to each other in a flat-file that uses delimiters to define the relationships. In another embodiment, the P_Keys can be mapped to each other in semi-structured format, such as a hierarchical XML format. In still another exemplary embodiment, the P_Keys can be mapped to each other using a fully structured format, such as a relational database. A person having skill in the art will appreciate that there are a number of suitable ways to store the Admin Partition Association Information so that a SM can access the information, and the above examples are not meant to be limiting.

Figure 13:
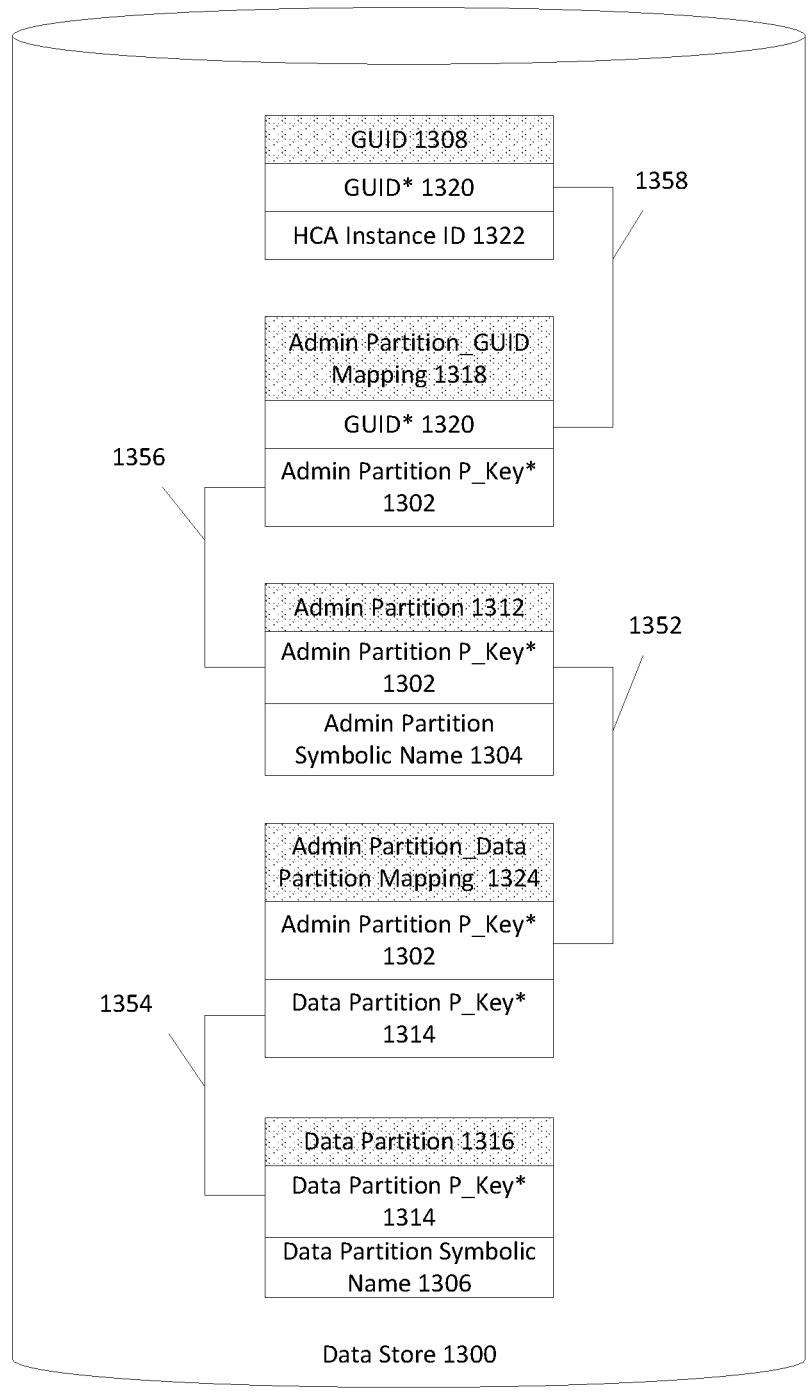
FIG. 13 shows an exemplary data store, in accordance with an embodiment.

FIG. 13 shows an exemplary data store 1300 for storing Admin Partition Association Information. Data store 1300 is depicted as tables in a relational database diagram, because such diagrams show the relationships between the related components. However, FIG. 13 is meant to be illustrative of the relationships between the Admin Partition Association Information, and not meant to be limiting. As discussed above, any suitable data structure can provide an embodiment of the invention. Indeed, an exemplary embodiment may include the Admin Partition Association Information replicated in several different formats across the fabric, where each format is suited for, and serves, a different primary purpose within the fabric.

As shown in FIG. 13, admin partition table 1312 can contain at least one admin partition P_Key 1302 that defines an admin partition within a subnet. Data partition table 1316 can contain at least one data partition P_Key 1314 that defines a data partition within the subnet. GUID table 1308 can contain at least one GUID 1320 that represents an end-port in the subnet. The represented end-port can be an end-port of a HCA (or vHCA) of a node within the subnet. For instance, GUID table 1308 can contain an HCA instance ID 1322 that associates each GUID with a specific HCA. HCA instance ID 1322 can be a unique ID of the associated specific HCA.

With continued reference to FIG. 13, Admin partition_data partition mapping table 1324 is created with relationship 1352 and relationship 1354. Admin partition_data partition mapping table 1324 can allow a SM (not shown) to access data showing which admin partition P_Keys 1302 are associated with which data partition P_Keys 1314. For example, a subnet manager can query data store 1300 to return each data partition P_Key 1314 that is associated with a specific admin partition P_Key 1302. Likewise, a SM can query data store 1300 for each admin partition P_Key 1302 that a specific data partition P_Key 1314 is associated with.

With further reference to FIG. 13, Admin partition_GUID mapping table 1318 is created with relationship 1356 and relationship 1358. Admin partition_GUID mapping table 1318 can allow a SM (not shown) to access data showing which admin partition P_Keys 1302 are associated with which GUIDs 1320. Since a GUID can represent an end-port of a HCA in the subnet, a SM can use this information to determine if a given end-port is a member of a given admin partition. For example, a subnet manager can query data store 1300 to return each admin partition P_Key 1304 that is related to a specific GUID 1320 (i.e., which admin partitions the given GUID is a "member" of).

In accordance with an embodiment, Admin Partition Association Information can include more, less or different data than that disclosed above. Moreover, Admin Partition Association Information can be related to other information in order to facilitate different operations throughout the fabric.

As noted above, the Admin Partition Association Information can be stored in any format that allows the SM to access the Admin Partition Association Information and determine members and associations through the stored relationships. For example, in accordance with an embodiment, Admin Partition Association Information can be stored in the fabric database. The tables holding the Admin Partition Association Information can be a subset of the fabric database and can include relationships to other tables not shown in FIG. 13. In accordance with another embodiment, the Admin Partition Association Information can be stored in a resident memory on a SM (e.g., in a partition.conf file). In accordance with yet another embodiment, the Admin Partition Association Information data store can be records held in a cache in a volatile random access memory (RAM) of a SM. Holding the Admin Partition Association Information data store in RAM has the advantage of fast lookup times and, consequently, less overhead imposed on the SM and the fabric infrastructure. At SM startup, the SM can read the Admin Partition Association Information into RAM from, e.g., the fabric database or a partition.conf file. Any updates can be written back to either the fabric database or the partition.conf file for persistence. Further, the fabric data base or partition.conf file can be backed up for purposes of disaster recovery.

Figure 14:
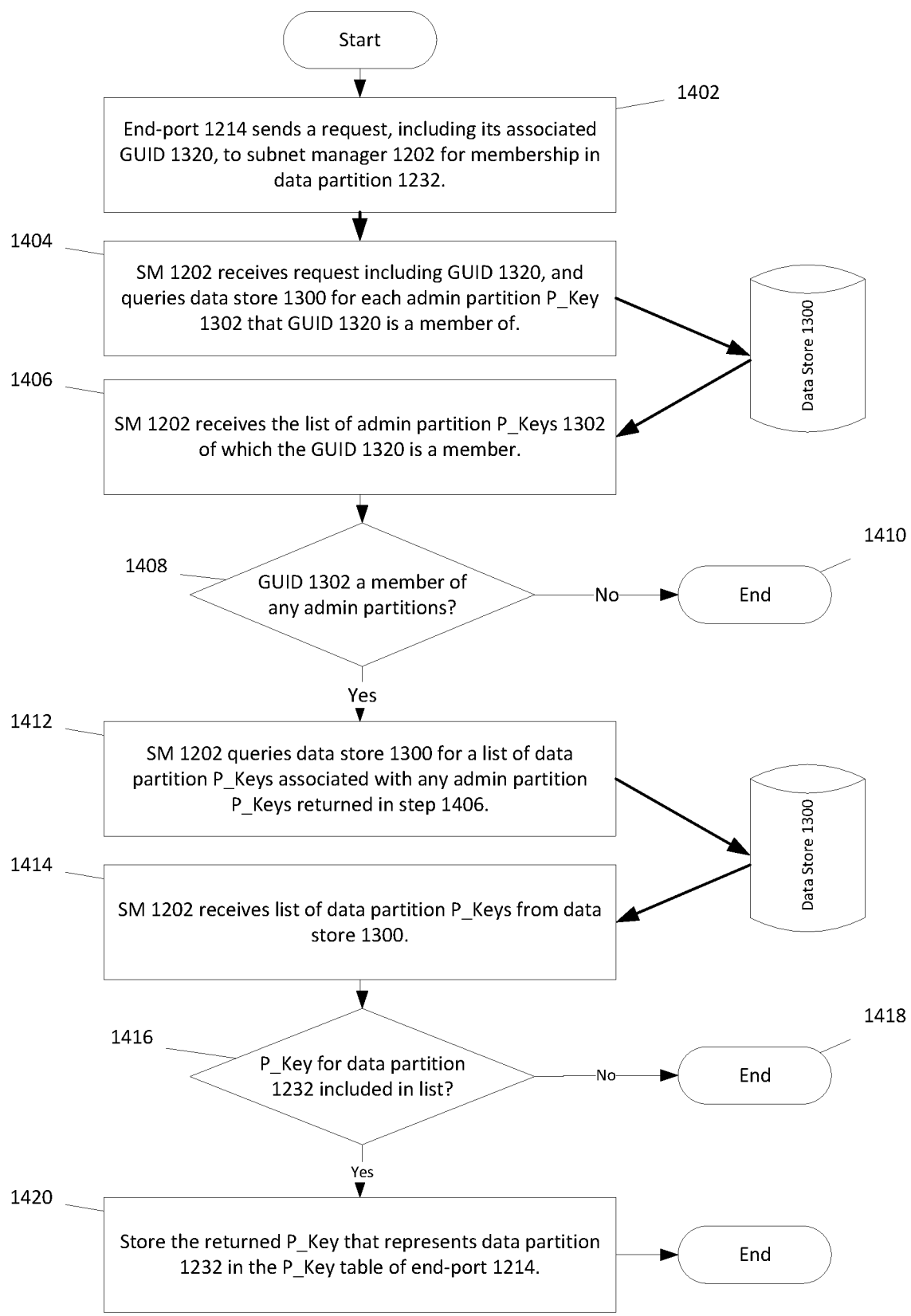
FIG. 14 is a flowchart depicting a process by which an end-port dynamically requests and receives membership in a data partition, in accordance with an embodiment.

FIG. 14 is an exemplary flow chart depicting an end-port dynamically requesting and receiving membership in a data partition.

At step 1402, and with additional reference to FIG. 12 and FIG. 13, end-port 1214 sends a request, including its associated GUID 1320, to subnet manager 1202 for membership in data partition 1232.

At step 1404, SM 1202 receives the request and queries data store 1300 for each admin partition P_Key 1302 that GUID 1320 is a member of.

At step 1406, SM 1202 receives, from data store 1300, the list of admin partition P_Keys 1302 of which the GUID 1320 of end-port 1214 is a member.

At step 1408, SM 1202 determines if GUID 1320 is a member of any admin partitions, based on the returned list from data store 1300. If the list is empty (or null)—i.e., if the end-port 1214 is not a member of any admin partition—the process proceeds to end at step 1410, because the end-port 1214 does not have inherent access rights to any data partition by virtue of membership in an admin partition. If the list has at least one entry, however, the process proceeds to step 1412.

At step 1412, SM 1202 queries data store 1300 for a list of data partition P_Keys associated with any admin partition P_Keys returned in step 1406.

At step 1214, SM 1202 receives the list of data partition P_Keys associated with any admin partition P_Keys returned in step 1406.

At step 1416, the SM determines if the P_Key that represents data partition 1232—the data partition for which end-port 1214 requested membership in at step 1402—is included in the returned list. If the P_Key for data partition 1232 is not included in the list, the process proceeds to step 1418, and ends. If, however, the P_Key that represents data partition 1232 is included in the list, the process proceeds to step 1420.

At step 1420, the subnet manager stores the returned P_Key that represents data partition 1232 in the P_Key table of end-port 1214, thereby making end-port 1214 a member of data partition 1232. The process then ends.

FIG. 14 depicts the SM making two requests to the data store at steps 1404 and 1412. This depiction, however, is meant to be illustrative of the information the subnet manager can use to determine if the end-port is 1) a member of any admin partition and, if so, 2) if the admin partition that the end-port has the requested data partition associated with it. It is to be understood that requests for this information by the SM to the data store can take place in a single query of the data store, or multiple queries of the data store, and that FIG. 14 is not meant to be limiting in this respect.

In accordance with an embodiment, both data partitions and admin partitions can be represented by symbolic names. Referring back to FIG. 13, data partition symbolic name 1306 and admin partition symbolic name 1304 can be included in the Admin Partition Association Information. Inclusion of symbolic names mapped to P_Keys of either admin partitions or data partitions can allow HCAs to request setup of data partitions by using symbolic names. A key benefit of allowing a HCA to use symbolic names as the basis for the host stack/HCA handling of partitions is that the P_Key values that represent the admin or data partitions at the subnet level, and that are mapped to the symbolic name of the partition, can be assigned at runtime, and/or can be changed in different system configurations.

For instance, and in accordance with an embodiment, a fabric host can be initialized and, as part of the initialization process, the HCA can send a request for membership in a data partition to a SM of the partition. The request for membership can be for a physical end-port or a virtual end-port (of a vHCA) associated with the HCA. The configuration driving the initialization can specify a symbolic name of the data partition for which the HCA is requesting membership, rather than a P_Key of the data partition. In this case, it is possible that the actual P_Key that will represent the data partition has not yet been generated in the subnet (e.g., the data partition P_Key 1314 field can be empty or null at the time of the request). The SM can generate the P_Key at the time of the request, and populate the Admin Partition Association Information with the generated P_Key. Moreover, a P_Key representing a partition can be dynamically changed without the need for reconfiguration at the host level. For instance, in the case of a fabric-level subnet merge, or other intrusive reconstruction of the fabric, where existing P_Key values may have to be changed (e.g., to avoid duplication), the SM could simply assign new P_Key values to the Admin Partition Association Information. These new P_Keys can then be pushed to the hosts by determining, through a querying of the Admin Partition Association Information data store, which hosts should receive the updated P_Keys.

In accordance with an embodiment, it is not necessary that the symbolic name used to specify a data partition be unique throughout the fabric, or even throughout the subnet. It is sufficient that the symbolic name be unique with respect to the set of all admin partitions that any given HCA is a member of—that is, the symbolic name can only be associated with a single data partition within the set of data partitions associated with all admin partitions that the HCA or end-port is a member of. In this way, similarly configured nodes (i.e., nodes configured to request data partition membership using a same symbolic partition name) that are members of different admin partitions may request membership in a data partition using a same well-defined symbolic name, but the mapping to the actual data partition P_Key value will be defined as a function of both the admin partition and the symbolic name. Hence, individual nodes can have the same basic configuration in terms of which data partition symbolic name they will request membership in, but the admin partition associations of each end-node or HCA will determine which data partitions these names actually map to.

Figure 15A:
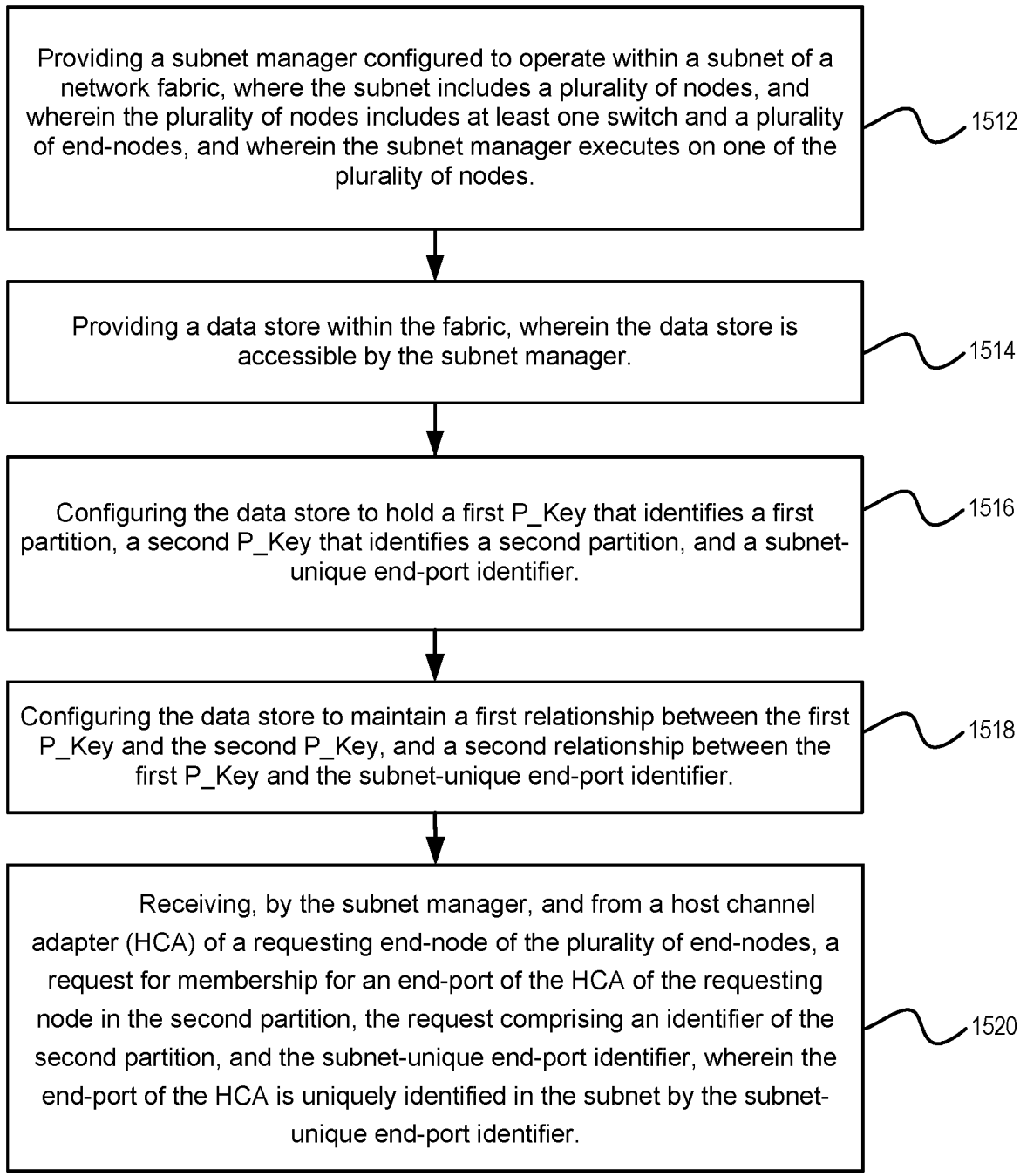
FIG. 15A and FIG. 15B are flowcharts for dynamically assigning membership in a partition, in accordance with an embodiment.
Figure 15B:
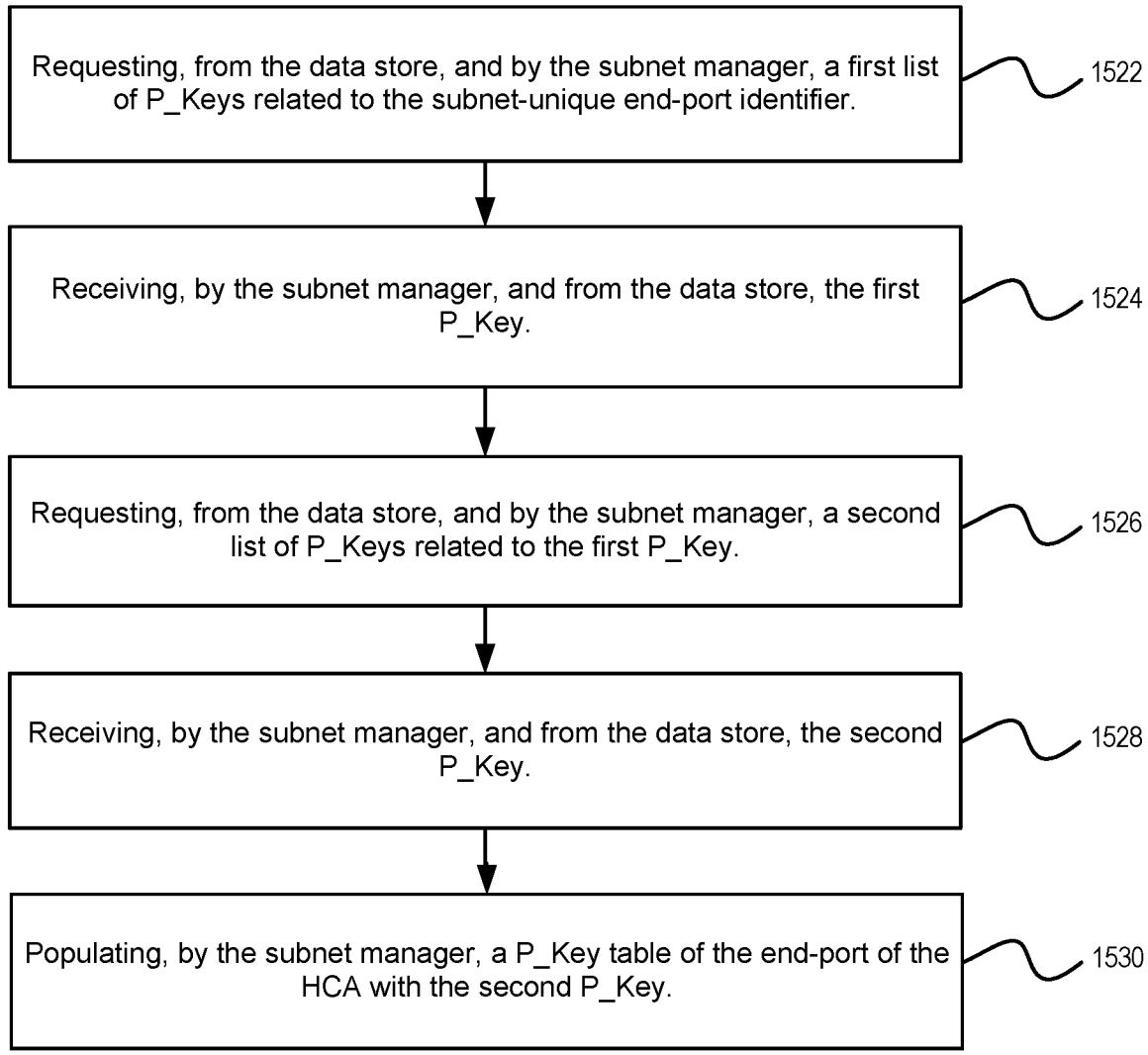

FIG. 15A and FIG. 15B is a flowchart for dynamically assigning membership in a partition, in accordance with an embodiment.

At step 1512, a subnet manager is provided within the subnet, where the subnet manager is configured to operate within a subnet of a network fabric, the subnet including a plurality of nodes, and the plurality of nodes including at least one switch and a plurality of end-nodes, and where the subnet manager executes on one of the plurality of nodes.

At step 1514, a data store is provided within the fabric, wherein the data store is accessible by the subnet manager.

At step 1516, the data store is configured to hold a first P_Key that identifies a first partition, a second P_Key that identifies a second partition, and a subnet-unique end-port identifier.

At step 1518, the data store is further configured to maintain a first relationship between the first P_Key and the second P_Key, and a second relationship between the first P_Key and the subnet-unique end-port identifier.

At step 1520, the subnet manager receives, from a host channel adapter (HCA) of a requesting end-node of the plurality of end-nodes, a request for membership for an end-port of the HCA of the requesting node in the second partition, where the request comprises an identifier of the second partition, and the subnet-unique end-port identifier, and where the end-port of the HCA is uniquely identified in the subnet by the subnet-unique end-port identifier.

At step 1522 the subnet manager requests, from the data store, a first list of P_Keys related to the subnet-unique end-port identifier.

At step 1524 the subnet manager receives from the data store, the first P_Key.

At step 1526, the subnet manager requests from the data store a second list of P_Keys related to the first P_Key.

At step 1528, the subnet manager receives from the data store the second P_Key.

At step 1530, the subnet manager populates a P_Key table of the end-port of the HCA with the second P_Key.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method of dynamically assigning membership in a partition, comprising:
    receiving, at a subnet manager and from an end port of a subnet, a request for the end port to be a member of a data partition defined within the subnet by a unique partition key (P_Key), the subnet comprising a plurality of subnet resources, the data partition being defined to have access rights to only a subset of the plurality of resources of the subnet;
    upon receiving the request from the end port of the subnet, querying, by the subnet manager, a data store to determine whether a relationship is defined between the end port and an admin partition of the subnet, the admin partition being defined within the subnet by another unique P_Key, the admin partition being further defined to have access rights to all of the plurality of resources of the subnet;
    upon determining the relationship is defined between the end port and the admin partition of the subnet, querying, by the subnet manager, the data store to determine a list of data partitions associated with the admin partition of the subnet;
    receiving, at the subnet manager, the list of the data partitions associated with the admin partition of the subnet;
    determining, by the subnet manager, that the data partition defined within the subnet is contained in the list of data partitions received by the subnet manager; and
    upon said determination that the data partition defined within the subnet is contained in the list of data partitions received by the subnet manager, adding the end port to the data partition.

2. The method of claim 1, wherein the received request comprises a globally unique identifier (GUID) of the end port.

3. The method of claim 2, wherein the querying, by the subnet manager, the data store to determine whether a relationship is defined between the end port and an admin partition of the subnet comprises determining a relationship between the GUID of the end port and at least one admin partition of the subnet.

4. The method of claim 1, wherein adding the end port to the data partition comprises storing a partition key (P_Key) associated with the data partition in a partition key table of the end port.

5. The method of claim 4, further comprising:
    configuring the data store to hold a symbolic name of the data partition; and
    configuring the data store to maintain a relationship between the symbolic name of the data partition and the P_Key associated with the data partition.

6. The method of claim 1, wherein the data store is accessible by the subnet manager.

7. The method of claim 6, wherein the data store comprises records held in a random access memory of the subnet manager.

8. A system for dynamically assigning membership in a partition, comprising:
    a computer comprising one or more microprocessors; and
    a subnet, the subnet comprising a subnet manager;
    wherein a request for an end port of the subnet to be a member of a data partition defined within the subnet by a unique partition key (P_Key) is received at the subnet manager, the request being sent by the end port of a subnet, the subnet comprising a plurality of subnet resources, the data partition being defined to have access rights to only a subset of the plurality of resources of the subnet;

wherein upon receiving the request from the end port of the subnet, the subnet manager queries a data store to determine whether a relationship is defined between the end port and an admin partition of the subnet, the admin partition being defined within the subnet by another unique P_Key, the admin partition being further defined to have access rights to all of the plurality of resources of the subnet;

wherein upon determining the relationship is defined between the end port and the admin partition of the subnet, the subnet manager queries the data store to determine a list of data partitions associated with the admin partition of the subnet;

wherein the subnet manager receives the list of the data partitions associated with the admin partition of the subnet;

wherein the subnet manager determines that the data partition defined within the subnet is contained in the list of data partitions received by the subnet manager; and wherein upon said determination that the data partition defined within the subnet is contained in the list of data partitions received by the subnet manager, the end port is added to the data partition.

9. The system of claim 8, wherein the received request comprises a globally unique identifier (GUID) of the end port.

10. The system of claim 9, wherein the querying, by the subnet manager, the data store to determine whether a relationship is defined between the end port and an admin partition of the subnet comprises determining a relationship between the GUID of the end port and at least one admin partition of the subnet.

11. The system of claim 8, wherein adding the end port to the data partition comprises storing a partition key (P_Key) associated with the data partition in a partition key table of the end port.

12. The system of claim 11,
wherein the data store is configure to hold a symbolic name of the data partition; and
wherein the data store is configured to maintain a relationship between the symbolic name of the data partition and the P_Key associated with the data partition.

13. The system of claim 8, wherein the data store is accessible by the subnet manager.

14. The system of claim 13, wherein the data store comprises records held in a random access memory of the subnet manager.

15. A non-transitory computer readable storage medium, including instructions stored thereon for dynamically assigning membership in a partition, which when read and executed by one or more computers cause the one or more computers to perform steps comprising:

receiving, at a subnet manager and from an end port of a subnet, a request for the end port to be a member of a data partition defined within the subnet by a unique partition key (P_Key), the subnet comprising a plurality of subnet resources, the data partition being defined to have access rights to only a subset of the plurality of resources of the subnet;

upon receiving the request from the end port of the subnet, querying, by the subnet manager, a data store to determine whether a relationship is defined between the end port and an admin partition of the subnet, the admin partition being defined within the subnet by another unique P_Key, the admin partition being further defined to have access rights to all of the plurality of resources of the subnet;

upon determining the relationship is defined between the end port and an admin partition of the subnet, querying, by the subnet manager, the data store to determine a list of data partitions associated with the admin partition of the subnet;

receiving, at the subnet manager, the list of the data partitions associated with the admin partition of the subnet;

determining, by the subnet manager, that the data partition defined within the subnet is contained in the list of data partitions received by the subnet manager; and upon said determination that the data partition defined within the subnet is contained in the list of data partitions received by the subnet manager, adding the end port to the data partition.

16. The non-transitory computer readable storage medium of claim 15, wherein the received request comprises a globally unique identifier (GUID) of the end port.

17. The non-transitory computer readable storage medium of claim 16, wherein the querying, by the subnet manager, the data store to determine whether a relationship is defined between the end port and an admin partition of the subnet comprises determining a relationship between the GUID of the end port and at least one admin partition of the subnet.

18. The non-transitory computer readable storage medium of claim 15, wherein adding the end port to the data partition comprises storing a partition key (P_Key) associated with the data partition in a partition key table of the end port.

19. The non-transitory computer readable storage medium of claim 18, the steps further comprising:
configuring the data store to hold a symbolic name of the data partition; and
configuring the data store to maintain a relationship between the symbolic name of the data partition and the P_Key associated with the data partition.

20. The non-transitory computer readable storage medium of claim 15,
wherein the data store is accessible by the subnet manager; and
wherein the data store comprises records held in a random access memory of the subnet manager.

* * * * *